United States Patent
Meisenholder et al.

(10) Patent No.: US 10,768,639 B1
(45) Date of Patent: Sep. 8, 2020

(54) MOTION AND IMAGE-BASED CONTROL SYSTEM

(71) Applicant: Snap Inc., Santa Monica, CA (US)

(72) Inventors: David Meisenholder, Manhattan Beach, CA (US); Steven Horowitz, Pacific Palisades, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 15/640,061

(22) Filed: Jun. 30, 2017

Related U.S. Application Data

(60) Provisional application No. 62/357,231, filed on Jun. 30, 2016.

(51) Int. Cl.
| | |
|---|---|
| *G06K 9/00* | (2006.01) |
| *G05D 1/12* | (2006.01) |
| *G06T 7/246* | (2017.01) |
| *G06T 7/73* | (2017.01) |
| *G05D 1/10* | (2006.01) |

(52) U.S. Cl.
CPC .............. *G05D 1/12* (2013.01); *G05D 1/102* (2013.01); *G06T 7/246* (2017.01); *G06T 7/73* (2017.01); *G06T 2207/10028* (2013.01); *G06T 2207/10032* (2013.01); *G06T 2207/30252* (2013.01)

(58) Field of Classification Search
CPC ........ B64C 2201/127; B64C 2201/141; B64C 39/024; B64C 2201/024; B64C 2201/108
USPC ............... 382/103, 154, 190, 284, 285, 294; 706/48; 345/419, 420
See application file for complete search history.

(56) References Cited

U.S. PATENT DOCUMENTS

| | | | |
|---|---|---|---|
| 6,038,295 | A | 3/2000 | Mattes |
| 6,819,982 | B2 | 11/2004 | Doane |
| 6,980,909 | B2 | 12/2005 | Root et al. |
| 7,173,651 | B1 | 2/2007 | Knowles |
| 7,411,493 | B2 | 8/2008 | Smith |
| 7,535,890 | B2 | 5/2009 | Rojas |
| 7,542,073 | B2 | 6/2009 | Li et al. |
| 8,131,597 | B2 | 3/2012 | Hudetz |
| 8,174,562 | B2 | 5/2012 | Hartman |

(Continued)

FOREIGN PATENT DOCUMENTS

| | | |
|---|---|---|
| CA | 2887596 A1 | 7/2015 |

OTHER PUBLICATIONS

Laput, Gierad, et al., "PixelTone: A Multimodal Interface for Image Editing", ACM, (2013), 10 pgs.

(Continued)

*Primary Examiner* — Charlotte M Baker
(74) *Attorney, Agent, or Firm* — Schwegman Lundberg & Woessner, P.A.

(57) ABSTRACT

Systems, devices, media, and methods are presented for detecting and interpreting motion of a device and a remote object to control operations of the device. The systems and methods identify a sensor input within a drone. The sensor input indicates movement of the drone within a three dimensional space. The systems and methods determine one or more movement attributes from the sensor input and, in response to the one or more movement attributes, selects one or more maneuvers corresponding to at least one movement attribute. The system and methods then execute the one or more maneuvers by controlling one or more drone control components to move the drone within the three dimensional space.

20 Claims, 14 Drawing Sheets

(56) References Cited

U.S. PATENT DOCUMENTS

| | | |
|---|---|---|
| 8,199,747 B2 | 6/2012 | Rojas et al. |
| 8,274,550 B2 | 9/2012 | Steuart |
| 8,332,475 B2 | 12/2012 | Rosen et al. |
| 8,718,333 B2 | 5/2014 | Wolf et al. |
| 8,724,622 B2 | 5/2014 | Rojas |
| 8,874,677 B2 | 10/2014 | Rosen et al. |
| 8,909,679 B2 | 12/2014 | Root et al. |
| 8,995,433 B2 | 3/2015 | Rojas |
| 9,040,574 B2 | 5/2015 | Wang et al. |
| 9,055,416 B2 | 6/2015 | Rosen et al. |
| 9,100,806 B2 | 8/2015 | Rosen et al. |
| 9,100,807 B2 | 8/2015 | Rosen et al. |
| 9,191,776 B2 | 11/2015 | Root et al. |
| 9,204,252 B2 | 12/2015 | Root |
| 9,344,642 B2 | 5/2016 | Niemi et al. |
| 9,345,711 B2 | 5/2016 | Friedhoff |
| 9,443,227 B2 | 9/2016 | Evans et al. |
| 9,471,059 B1 | 10/2016 | Wilkins |
| 9,489,661 B2 | 11/2016 | Evans et al. |
| 9,489,937 B1 | 11/2016 | Beard et al. |
| 9,491,134 B2 | 11/2016 | Rosen et al. |
| 9,576,369 B2 | 2/2017 | Venkataraman et al. |
| 9,589,448 B1 | 3/2017 | Schneider et al. |
| 9,681,046 B2 | 6/2017 | Adsumilli et al. |
| 9,723,272 B2 | 8/2017 | Lu et al. |
| 9,747,901 B1 | 8/2017 | Gentry |
| 9,922,659 B2 | 3/2018 | Bradlow et al. |
| 9,989,965 B2 * | 6/2018 | Cuban .................... H04N 7/185 |
| 10,061,328 B2 * | 8/2018 | Canoy ................. G08G 5/0078 |
| 10,140,987 B2 | 11/2018 | Erickson et al. |
| 10,168,700 B2 * | 1/2019 | Gordon ............... G05D 1/0016 |
| 10,501,180 B2 | 12/2019 | Yu |
| 2007/0250526 A1 | 10/2007 | Hanna |
| 2008/0255842 A1 | 10/2008 | Simhi |
| 2009/0122133 A1 | 5/2009 | Hartman |
| 2011/0202598 A1 | 8/2011 | Evans et al. |
| 2012/0194420 A1 | 8/2012 | Osterhout et al. |
| 2012/0209924 A1 | 8/2012 | Evans et al. |
| 2012/0281885 A1 | 11/2012 | Syrdal et al. |
| 2012/0287274 A1 | 11/2012 | Bevirt |
| 2013/0056581 A1 | 3/2013 | Sparks |
| 2013/0238168 A1 | 9/2013 | Reyes |
| 2015/0022432 A1 | 1/2015 | Stewart et al. |
| 2015/0070272 A1 | 3/2015 | Kim et al. |
| 2015/0175263 A1 | 6/2015 | Reyes |
| 2015/0199022 A1 | 7/2015 | Gottesman et al. |
| 2015/0287246 A1 | 10/2015 | Huston et al. |
| 2015/0331490 A1 | 11/2015 | Yamada |
| 2015/0362917 A1 | 12/2015 | Wang et al. |
| 2016/0063987 A1 | 3/2016 | Xu et al. |
| 2016/0161946 A1 | 6/2016 | Wuth Sepulveda et al. |
| 2016/0179096 A1 | 6/2016 | Bradlow et al. |
| 2016/0292886 A1 | 10/2016 | Erad et al. |
| 2016/0307573 A1 | 10/2016 | Wobrock |
| 2016/0336020 A1 | 11/2016 | Bradlow et al. |
| 2017/0031369 A1 * | 2/2017 | Liu ........................ G05D 1/102 |
| 2017/0094259 A1 | 3/2017 | Kouperman et al. |
| 2017/0099424 A1 | 4/2017 | Jones |
| 2017/0102699 A1 | 4/2017 | Anderson |
| 2017/0177925 A1 * | 6/2017 | Volkart ................. B64C 39/024 |
| 2017/0225796 A1 | 8/2017 | Sun et al. |
| 2017/0228690 A1 | 8/2017 | Kohli |
| 2017/0244937 A1 | 8/2017 | Meier et al. |
| 2017/0337791 A1 | 11/2017 | Gordon-carroll |
| 2017/0371353 A1 | 12/2017 | Millinger, III |
| 2018/0082682 A1 | 3/2018 | Erickson et al. |
| 2019/0011921 A1 | 1/2019 | Wang et al. |

OTHER PUBLICATIONS

Leyden, John, "This SMS will self-destruct in 40 seconds", [Online]. Retrieved from the Internet: <URL: http://www.theregister.co.uk/2005/12/12/stealthtext/, (Dec. 12, 2005), 1 pg.

Meisenholder, David, et al., "Remoteless Control of Drone Behavior", U.S. Appl. U.S. No. 15/640,143, dated Jun. 30, 2017, 108 pgs.

"U.S. Appl. No. 15/640,143, Final Office Action dated Apr. 19, 2019", 20 pgs.

"U.S. Appl. No. 15/640,143, Non Final Office Action dated Sep. 5, 2019", 17 pgs.

"U.S. Appl. No. 15/640,143, Non Final Office Action dated Oct. 30, 2018", 19 pgs.

"U.S. Appl. No. 15/640,143, Notice of Allowance dated Feb. 3, 2020", 9 pgs.

"U.S. Appl. No. 15/640,143, Response filed Jan. 6, 2020 to Non Final Office Action dated Sep. 5, 2019", 11 pgs.

"U.S. Appl. No. 15/640,143, Response filed Feb. 28, 2019 to Non Fina Office Action dated Oct. 30, 2018", 16 pgs.

"U.S. Appl. No. 15/640,143, Response filed Jun. 21, 2019 to Final Office Action dated Apr. 19, 2019", 12 pgs.

"U.S. Appl. No. 15/640,143, Notice of Allowance dated May 21, 2020", 10 pgs.

* cited by examiner

MOTION AND IMAGE-BASED CONTROL SYSTEM

CROSS-REFERENCE TO RELATED APPLICATIONS

This application claims the benefit of priority of U.S. Provisional Application Ser. No. 62/357,231, filed Jun. 30, 2016, which is hereby incorporated by reference in its entirety.

TECHNICAL FIELD

Embodiments of the present disclosure relate generally to motion and image-based control of a remote device. More particularly, but not by way of limitation, the present disclosure addresses systems and methods for detecting and interpreting motion of a device and a remote object to control operations of the device.

BACKGROUND

Unmanned aerial vehicles (UAVs), commonly known and further referred to herein as aerial drones, or simply drones are often sized for portability and personal user of a single person. Drones are often configured for relatively low-level flight, typically within viewing range of persons at ground level. Such drones are further referred to herein as personal drones, or simply drones. Some existing drones are controlled by a dedicated wireless remote control device. Such control devices rely on considerable skill and practice for effective operation. The drone is, in such cases, not usable without the remote control device. Use of the remote control device requires a user to carry and have not only the drone, but also the remote control device. such remote control devices are subject to interference, battery and power supply limitations, and manipulation errors.

BRIEF DESCRIPTION OF THE DRAWINGS

Various ones of the appended drawings merely illustrate example embodiments of the present disclosure and should not be considered as limiting its scope.

Figure 1:
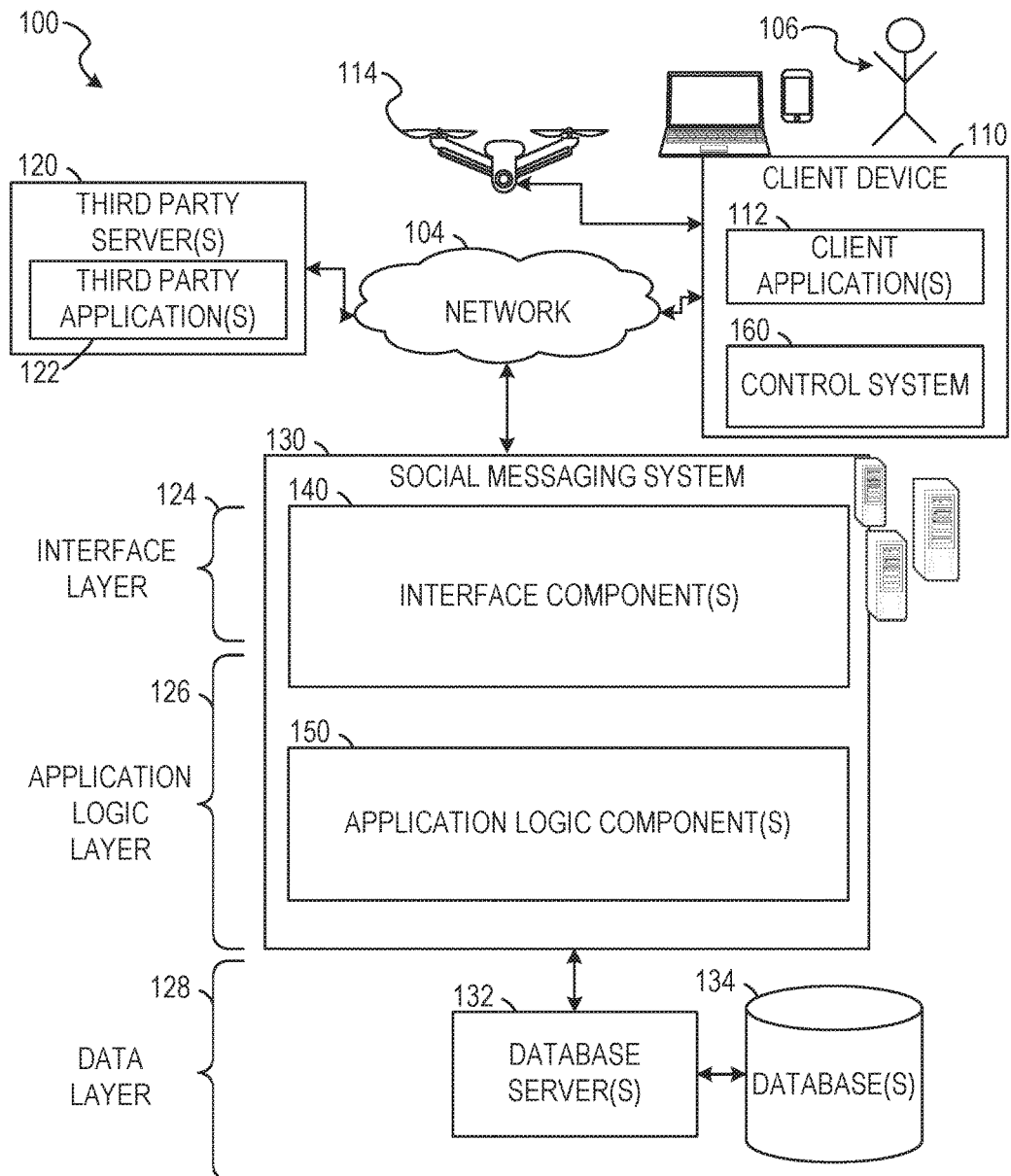
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products illustrative of embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Embodiments and aspects of the present disclosure describe methods and systems for control of a remote device. Some example embodiments describe motion and image-based control of a remote device. Some example embodiments describe voice-based control of a remote device. Some example embodiments describe multimodal methods and systems for control of a remote device, such as an aerial drone, allowing use of motion, image-based control, voice-based control, or combinations thereof. A drone, employing aspects of the present disclosure, may react to movement by performing actions or maneuvers responsive to detected movement. The drone may react to movements imposed on the drone or movements of an object (e.g., the user) viewable through an image capture device coupled to the drone. For example, a user may toss the drone into the air like a flying disc. The drone may detect aspects of the toss including rotational motion and translational motion. The drone interprets these motion aspects and selects maneuvers to perform responsive to the motion aspects. The drone may then stabilize or correct a flight path and position itself at a starting point for the maneuvers. The drone may then execute the maneuvers and land or await further input from the user.

Typically, control of remote devices, such as remote controlled vehicles, aerial drones, and image capture devices, is performed using a remote control device. Wired or wireless remote controls (e.g., a controller) send signals to devices beyond reach of a user. Often controllers employ tactile controls, such as joy sticks, buttons, and levers. More recently controllers may incorporate virtual representations, similar to tactile controls, using a touch screen. Typical controllers enable operation of the remote device by transmitting signals, such as radio waves, in response to manipulation by the user. For example, a user may place an aerial drone on the ground and interact with the controller to launch the aerial drone, control flight maneuvers, and land the aerial drone. Accessories attached to remote devices, such as cameras or speakers, may also be manipulated using a controller.

Typically, remote devices operate within a predefined range, such as a radius around a user. Often the predefined range is limited to a transmission range of the controller. The range of the remote device or the signals from the controller may be negatively affected by environmental conditions, interference from competing signals (e.g., radio waves) or other controllers, power limitations of the controller.

Some aspects of the present disclosure provide methods and systems for multimodal control or operation of a remote device. Modes of remote device operation include voice-controlled operation, gesture controlled operation, movement controlled operation, user identified operation, and combinations thereof. In one aspect of voice-controlled operation, the disclosure provides a method of and a system for voice-controlled operation of a drone. Some embodiments thus provide for a drone or a drone system configured to receive a voice command issued by a user, to identify a particular predefined drone function corresponding to the voice command, and to execute the commanded function. Voice-controls may be received at a voice capture device integral to the drone (e.g., remote device), a voice capture device coupled to the drone, a voice capture device proximate to a user or operator of the drone and transmitting signals representative of captured speech to the drone, combinations thereof, or any other suitable sound capture device.

In one aspect of motion-controlled operation, the disclosure provides a method and system for controlling at least one initial operation of a drone based on an initial motion of the drone imparted by a user. For example, an initial toss, roll, or spin may cause the drone to perform operations determined from aspects of the initial motion. In some embodiments, motion-controlled operation may include gestures of a user captured by the drone using a camera. Motion-controlled operation may also include user identification and tracking, such that the drone identifies a specified user as an operator and performs maneuvers or other operations based on motions, gestures, or voice commands of the selected operator.

The above are a few specific examples. The various embodiments of the present disclosure relate to devices and instructions by one or more processors of a device to control remote devices. A control system is described that enables control of a device, remote from an operator, based on one or more of sounds or actions of a user, an initial action of a user on the device, an initial sound of the user prior to the device being remote from the operator, combinations thereof, or any other similar actions.

FIG. 1 is a network diagram depicting a network system 100 having a client-server architecture configured for exchanging data over a network, according to one embodiment. For example, the network system 100 may be a messaging system where clients communicate and exchange data within the network system 100. The data may pertain to various functions (e.g., sending and receiving text and media communication, determining geolocation, etc.) and aspects (e.g., transferring communications data, receiving and transmitting indications of communication sessions, etc.) associated with the network system 100 and its users. Although illustrated herein as client-server architecture, other embodiments may include other network architectures, such as peer-to-peer or distributed network environments.

As shown in FIG. 1, the network system 100 includes a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each component or engine shown in FIG. 1 represents a set of executable software instructions and the corresponding hardware (e.g., memory and processor) for executing the instructions, forming a hardware-implemented component or engine and acting, at the time of the execution of instructions, as a special purpose machine configured to carry out a particular set of functions. To avoid obscuring the inventive subject matter with unnecessary detail, various functional components and engines that are not germane to conveying an understanding of the inventive subject matter have been omitted from FIG. 1. Of course, additional functional components and engines may be used with a social messaging system, such as that illustrated in FIG. 1, to facilitate additional functionality that is not specifically described herein. Furthermore, the various functional components and engines depicted in FIG. 1 may reside on a single server computer or client device, or may be distributed across several server computers or client devices in various arrangements. Moreover, although the social messaging system 130 is depicted in FIG. 1 as a three-tiered architecture, the inventive subject matter is by no means limited to such an architecture.

As shown in FIG. 1, the interface layer 124 consists of interface component(s) (e.g., a web server) 140, which receives requests from various client-computing devices and servers, such as client device 110 executing client application(s) 112, and third party server(s) 120 executing third party application(s) 122. In response to received requests, the interface component(s) 140 communicates appropriate responses to requesting devices via a network 104. For example, the interface component(s) 140 can receive requests such as Hypertext Transfer Protocol (HTTP) requests, or other web-based, Application Programming Interface (API) requests.

The client device 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). Further, in some example embodiments, the client device 110 forms all or part of a control system 160 such that components of the control system 160 configure the client device 110 to perform a specific set of functions with respect to operations of the control system 160.

In an example, the client device 110 is executing the client application(s) 112. The client application(s) 112 can provide functionality to present information to a user 106 and communicate via the network 104 to exchange information with the social messaging system 130. Further, in some examples, the client device 110 executes functionality of the control system 160 to control a device remote from an operator, based on actions, sounds, characteristics, or context of the operator.

Each client device 110 can comprise a computing device that includes at least a display and communication capabilities with the network 104 to access the social messaging system 130, other client devices, and third party server(s) 120. Client devices 110 comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. User 106 can be a person, a machine, or other means of interacting with the client device 110. In some embodiments, the user 106 interacts with the social messaging system 130 via the client device 110. The user 106 may not be part of the networked system 100, but may be associated with the client devices 110.

As shown in FIG. 1, a drone(s) 114 is shown as a schematic view of a UAV or aerial drone in accordance with one example embodiment. The schematic representation of the drone 114 and systems components may not be comprehensive representations of all components of these devices, but rather focus on those components particularly pertinent to the current disclosure. In some embodiments, the drone is a noncommercial, personal drone designed and configured for short-range flights within visual range of the operator or user 106. In some instances, the drone 114 is a battery-powered quad copter-type aerial vehicle that is relatively lightweight and sized for ready portability and manual launch. In some embodiments, the drone 114 is configured for manual launch with flight control and propulsion components configured to deploy during or after the manual launch, such as the drone 114 being thrown.

In some example embodiments, the drone 114 is configured for remote control by an operator 106 exclusively by use of one or more commands comprising audio/voice, gesture, and manual launch commands. The drone 114 is, in this example embodiment, moreover configured for voice and/or gesture control directly between the operator 106 and the drone 114, without intermediation by any off-board microphone, camera, or other electronic device. To this end, the drone 114 includes an onboard microphone and an onboard image capture device (e.g., a camera) incorporated in the drone 114 and mounted on a body of the drone 114. The onboard microphone, in this example embodiment, is a multidirectional or omnidirectional microphone mounted on the body in a fixed orientation or articulable orientation. Similarly, the onboard image capture device may be a camera mounted on the body in a fixed or articulable orientation.

The drone 114 may include one or more processors configured to perform various automated control functions such as those described herein. The drone 114 may further include electromechanical flight systems to control in-flight behavior, onboard memory, and a variety of sensors for measuring different respective metrics and movement of the drone 114. The sensors may include a set of accelerometers arranged to measure not only directional linear acceleration of the drone 114 as well as triaxial rotation and changes in orientation of the drone 114.

In some embodiments, the drone 114 further has a voice recognition engine configured to recognize a particular voice in an audio stream captured by the onboard microphone as being that of the operator 106. A speech recognition engine forming part of the drone 114 is configured to recognize within an operator voice stream, isolated by the voice recognition engine, any predefined spoken commands, and to communicate the identified operator-issued commands to the controller. It will be appreciated that although the speech recognition engine and the voice recognition engine may be separate from the controller, these components may in other embodiments be provided by a single processing unit, or by a greater number of dispersed hardware components and/or software components. In some embodiments, the drone additionally includes an active noise suppressor. The drone may also cooperate with the client device 110 to receive voice or audio commands from the client device 110, proximate to the user 106.

For example, in some embodiments, a portion of the voice or image-based control of the drone 114 is effected by use of an offboard microphone incorporated in the client device 110 separate from the drone 114. The client device 110 may be a multifunctional device in the form of a mobile phone. Where the audio stream is captured at the client device, a wireless communications link may be provided between the drone 114 and the client device 110 to transmit the commands from the client device 110 to the drone 114.

The camera or image capture device of the drone 114 may continuously capture a video feed in which the operator 106 is present, as described in embodiments of the present disclosure below. The video feed captured by the camera is processed on-the-fly by an onboard image processor of the drone 114 to recognize a face, a body, a clothing selection, or other distinguishing characteristics or aspects of the operator 106. The image processor may identify facial movements, body movements, or other gestures of the operator 106. The gestures may indicate one or more of speech or control gestures, actions, or motions. Such visual detection by the image processor may be used by the voice recognition engine in isolating the operator voice stream, identifying the operator 106, or controlling the drone 114 by image-based gesture control. Where the visual detection is used by the voice recognition engine, the voice recognition engine may correlate automatically recognized facial movements of the operator 106 with a synchronously received voice stream. The camera may have a wide angled lens configured for providing a viewing range of 360° around an operatively upright axis, and greater than 180° in both remaining axes orthogonal to the upright axis. This wide angled camera may be mounted on a lower side of the drone body, thereby to continuously capture substantially everything below and at the vertical level of the drone 114, in use.

In some embodiments, the image processor of the drone 114 is configured to automatically detect the operator 106 in the video feed from the camera, and to track the location of the operator 106, as described in embodiments below. This information may be used by the controller to automatically point the directional microphone consistently at the operator 106, orient the drone 114 to perform maneuvers relative to the operator 106, and perform other maneuver selection or flight operations.

In addition to capturing images of the operator 106, to orient and control the drone 114, as described below, embodiments of the present disclosure enable the camera to capture audiovisual content by use of the drone 114. Such audiovisual content may have superior quality compared to conventional drones. In some embodiments, such improved audio quality is achieved by combining audio captured by an offboard microphone with the video content captured by the drone camera. In a system such as that, for example, the system automatically store audio captured by the offboard microphone provided on the user's mobile phone 110 with the video feed captured by the camera of the drone 114. The captured audio may in such examples be streamed to the drone 114, for combination and storage with the video in drone memory. Instead, the video feed may be streamed from the drone 114 to the client device 110 for collection and storage on a memory of the client device 110.

As shown in FIG. 1, the data layer 128 has database server(s) 132 that facilitate access to information storage repositories or database(s) 134. The database(s) 134 are storage devices that store data such as member profile data, social graph data (e.g., relationships between members of the social messaging system 130), image modification preference data, accessibility data, and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes various application logic components 150, which, in conjunction with the interface component(s) 140, generate various user interfaces with data retrieved from various data sources or data services in the data layer 128. Individual application logic components 150 may be used to implement the functionality associated with various applications, services, and features of the social messaging system 130. For instance, a social messaging application can be implemented with at least a portion of the application logic components 150. The social messaging application provides a messaging mechanism for users of the client devices 110 to send and receive messages that include text and media content such as pictures and video. The client devices 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application logic components 150.

As illustrated in FIG. 1, the social messaging system 130 may include at least a portion of the control system 160 capable of controlling a device remote from an operator, based on actions, sounds, characteristics, or context of the operator. Similarly, the client device 110 includes at least a portion of the control system 160, as described above. In other examples, client device 110 may include the entirety of the control system 160. In instances where the client device 110 includes a portion of (or all of) the control system 160, the client device 110 can work alone or in cooperation with the social messaging system 130 to provide the functionality of the control system 160 described herein.

In some embodiments, the social messaging system 130 may be an ephemeral message system that enables ephemeral communications where content (e.g., video clips or images) are deleted following a deletion trigger event such as a viewing time or viewing completion. In such embodiments, a device uses the various components described herein within the context of any of generating and sending aspects of an ephemeral message. For example, a device implementing the control system 160 may control a device, remote from an operator, based on actions, sounds, characteristics, or context of the operator to capture an image and transmit the image in an ephemeral message using the social messaging system 130. The device may control the remote device as a part of a generation of content for an ephemeral message and transmit the ephemeral message to one or more of a mobile computing device of the operator, a client device of another user, or a server machine associated with the social messaging system 130.

Figure 2:
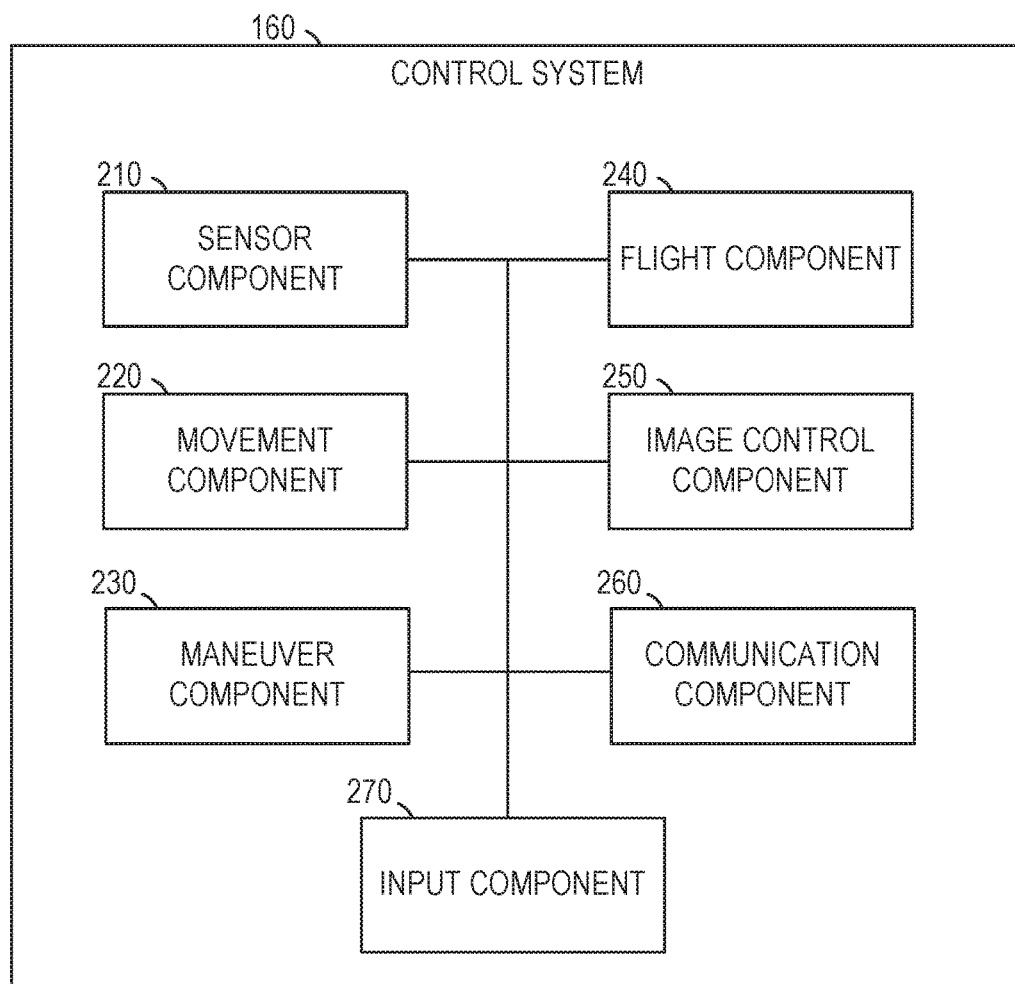
FIG. 2 is a diagram illustrating a control system, according to some example embodiments.

In FIG. 2, in various embodiments, the control system 160 can be implemented as a standalone system or implemented in conjunction with the client device 110, and is not necessarily included in the social messaging system 130. The control system 160 is shown to include a sensor component 210, a movement component 220, a maneuver component 230, a flight component 240, an image control component 250, a communication component 260, and an input component 270. All, or some, of the components 210-270, communicate with each other, for example, via a network coupling, shared memory, and the like. Each component of components 210-270 can be implemented as a single component, combined into other components, or further subdivided into multiple components. Other components not pertinent to example embodiments can also be included, but are not shown.

Figure 3:
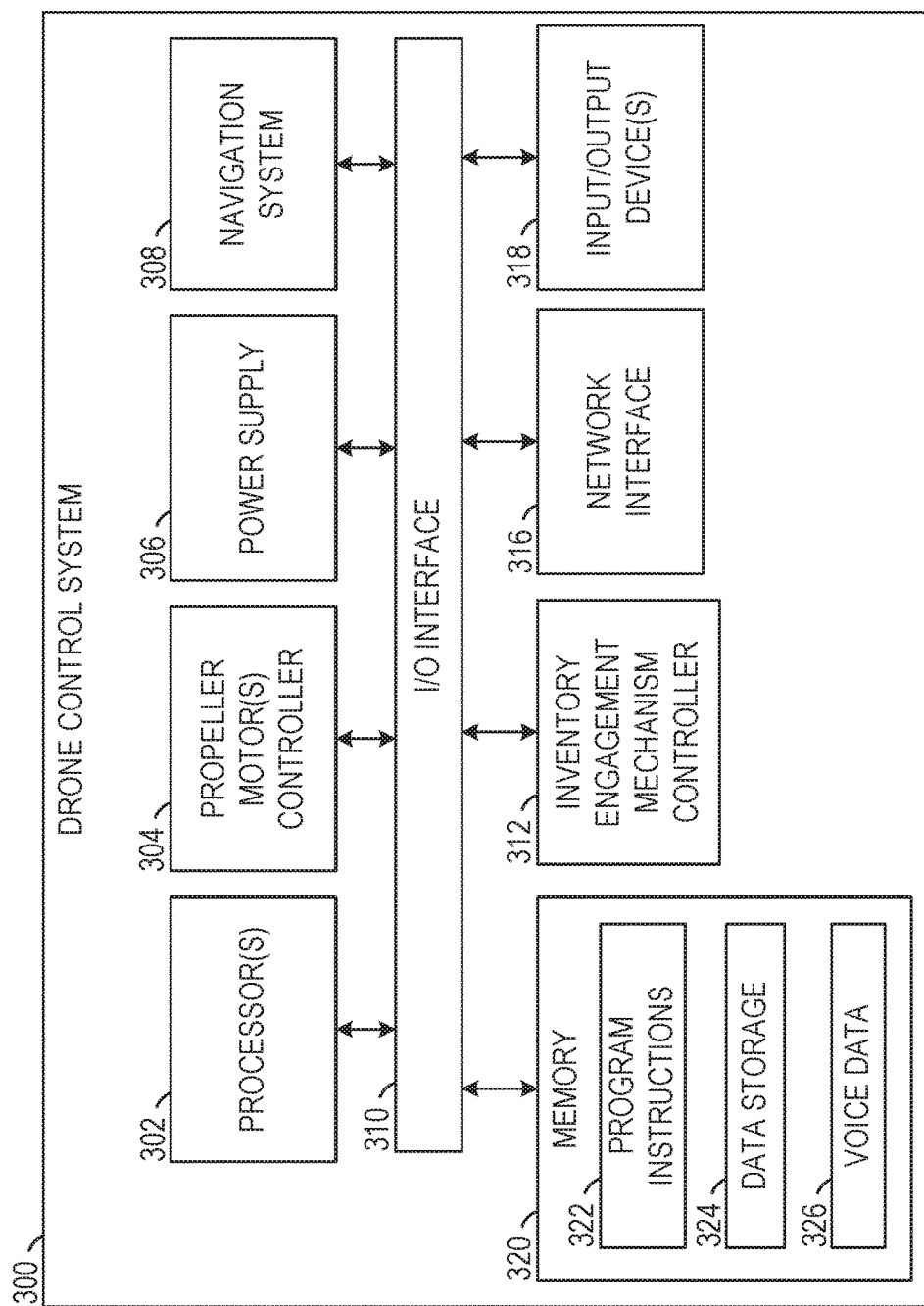
FIG. 3 is a block diagram illustrating a drone control system, according to some example embodiments.

FIG. 3 is a block diagram illustrating an example drone control system 300 of the drone 114. In some embodiments, as noted above in FIG. 2, the control system 160 may be included or partially included in memory of the drone 114 or as components of the drone 114. For example, in some embodiments, portions of the control system 160 (e.g., the sensor component 210, the movement component 220, the maneuver component 230, and the flight component 240) form portions of one or more of the navigation system 308 and the propeller motor controller 304.

In various examples, the block diagram may be illustrative of one or more aspects of the drone control system 300 that may be used to implement the various systems and methods discussed below. In the illustrated implementation, the drone control system 300 includes one or more processors 302, coupled to a non-transitory computer readable storage medium 320 or non-transitory processor-readable storage medium 320 via an input/output (I/O) interface 310. The drone control system 300 may also include a propeller motor controller 304, such as an electronic speed control (ESC), a power module 306 and/or a navigation system 308. The drone control system 300 further includes an inventory engagement mechanism controller 312, a network interface 316, and one or more input/output devices 318.

In various implementations, the drone control system 300 may be a uniprocessor system including one processor 302, or a multiprocessor system including several processors 302 (e.g., two, four, eight, or another suitable number). The processor(s) 302 may be any suitable processor capable of executing instructions. For example, in various implementations, the processor(s) 302 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 302 may commonly, but not necessarily, implement the same ISA.

The non-transitory computer readable storage medium 320 may be configured to store executable instructions, data, navigation paths and/or data items accessible by the processor(s) 302. In various implementations, the nontransitory computer readable storage medium 320 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 320 as program instructions 322, data storage 324 and voice data 326, respectively. In other implementations, program instructions, data and/or voice data may be received, sent or stored upon different types of computer-accessible media, such as non-transitory media, or on similar media separate from the non-transitory computer readable storage medium 320 or the drone control system 300. Generally speaking, a non-transitory, computer readable storage medium may include storage media or memory media such as magnetic or optical media, e.g., disk or CD/DVDROM, coupled to the drone control system 300 via the I/O interface 310. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 316.

In one implementation, the I/O interface 310 may be configured to coordinate I/O traffic between the processor(s) 302, the non-transitory computer readable storage medium 320, and any peripheral devices, the network interface 310 or other peripheral interfaces, such as input/output devices 318. In some implementations, the I/O interface 310 may perform any necessary protocol, timing or other data transformations to convert data signals from one component (e.g., non-transitory computer readable storage medium 320) into a format suitable for use by another component (e.g., processor(s) 302). In some implementations, the I/O interface 310 may include support for devices attached through various types of peripheral buses, such as a variant of the Peripheral Component Interconnect (PCI) bus standard or the Universal Serial Bus (USB) standard, for example. In some implementations, the function of the I/O interface 310 may be split into two or more separate components, such as a north bridge and a south bridge, for example. Also, in some implementations, some or all of the functionality of the I/O interface 310, such as an interface to the non-transitory computer readable storage medium 320, may be incorporated directly into the processor(s) 302.

The propeller motor(s) controller 304 communicates with the navigation system 308 and adjusts the power of each propeller motor to guide the drone 114 along a determined navigation path to a delivery location, through a set of maneuvers, through a set of maneuvers relative to the user 106 or an object in the field of view of a camera (e.g., input device 318) providing information to the drone control system 300, or for any other flight, land, or water navigation path. The navigation system 308 may include a GPS or other similar system than can be used to navigate the drone 114 to and/or from a delivery location, a user location, through a set of maneuvers, or any other suitable preprogrammed or dynamically determined motions, movements, or paths. The inventory engagement mechanism controller 312 communicates with the motor(s) (e.g., a servo motor) used to engage and/or disengage a payload, inventory, item retrieved from a field of view, or any other suitable object coupled to the drone. For example, when the drone 114 is positioned over a level surface at a delivery location, the inventory engagement mechanism controller 312 may provide an instruction to a motor that controls the inventory engagement mechanism to release the inventory. By way of further example, in response to one or more gesture or voice command from a user, the drone 114 may retrieve a selected or specified object appearing within a field of view of a camera coupled to the drone. Upon a further command or responsive to arrival at a selected or predetermined location, the inventory engagement mechanism controller 312 may release the object.

The network interface 316 may be configured to allow data to be exchanged between the drone control system 300, other devices attached to a network, such as other computer systems, and/or with drone control systems of other drones. For example, the network interface 316 may enable wireless communication between numerous drones that are transporting inventory to various delivery destinations; interacting with users; performing coordinated maneuvers for audiovisual, video, or image capture operations; or operating within a suitable proximity. In various implementations, the network interface 316 may support communication via wireless general data networks, such as a Wi-Fi network. For example, the network interface 316 may support communication via telecommunications networks such as cellular communication networks, satellite networks, and the like.

Input/output devices 318 may, in some implementations, include one or more displays, image capture devices, thermal sensors, infrared sensors, time of flight sensors, accelerometers, pressure sensors, weather sensors, etc. Multiple input/output devices 318 may be present and controlled by the drone control system 300. One or more of these sensors may be utilized to assist in the landing as well as avoid obstacles during delivery and/or engagement of inventory; performing maneuvers indicated by gestures of a user; engaging in coordinated maneuvers, operations, or video capture operations, alone, in coordination with other drones, in response to commands from a user, or automatically; or in performing maneuvers responsive to manual launch (e.g., tossing) of the drone with an initial velocity and direction. For example, utilizing a location signal from the GPS receiver and one or more IR sensors, the UAV may safely land on a location designated by the user. The IR sensors may be used to provide real-time data to assist the UAV in avoiding moving/movable obstacles.

As shown in FIG. 3, the memory 320 may include program instructions 322 which may be configured to implement the example processes and/or sub-processes described above. The data storage 324 may include various data stores for maintaining data items that may be provided for determining navigation paths, retrieving inventory, landing, identifying a level surface for disengaging inventory, etc.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Figure 4:
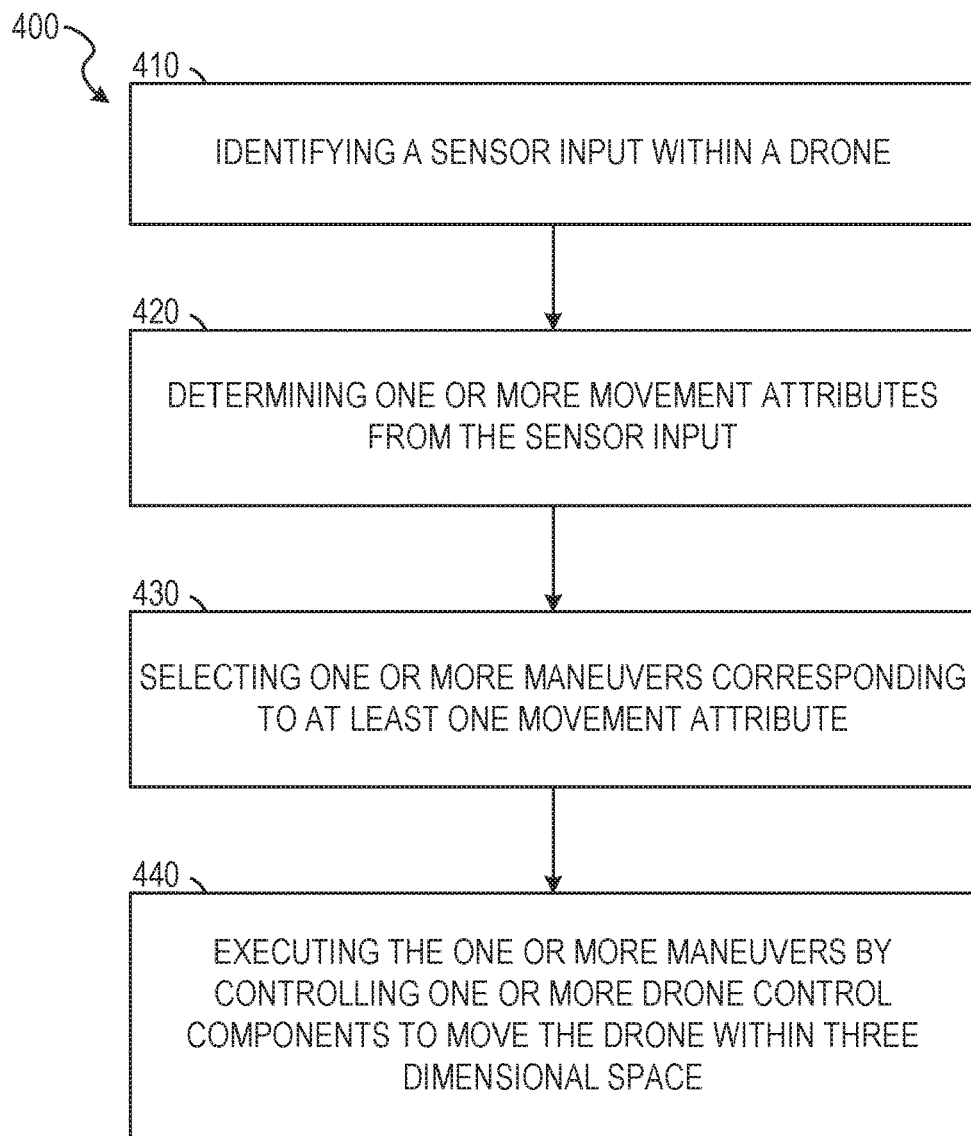
FIG. 4 is a flow diagram illustrating an example method for control of a remote device, according to some example embodiments.

FIG. 4 depicts a flow diagram illustrating an example method 400 for controlling a device remote from an operator. The operations of method 400 may be performed by components of the control system 160, and are so described below for purposes of illustration.

In operation 410, the sensor component 210 identifies a sensor input within a drone. The sensor input indicates or comprises sensory information quantifying movement of the drone within a three dimensional space. In some embodiments, the drone comprises one or more sensors and one or more drone control components. As described above with respect to FIG. 2, the sensors may include a plurality of sensors, such as one or more GPS sensors, one or more accelerometers (e.g., accelerometers measuring directional acceleration, triaxial rotation, and orientation changes), one or more proximity sensors, one or more optical sensors (e.g., optical proximity sensors), or any other suitable sensor. For example, suitable sensors, operating as the sensor component 210 or as part of the sensor component 210, may be capable of determining a position, a relative position, or a change of position, or capable of communicating with one or more systems external to the drone to determine the position, relative position, or change in position of the drone.

In some embodiments, the sensor component 210 identifies the sensor input based on a launch of the drone. The launch results in an initial change in position of the drone. For example, a user of the drone may throw the drone into the three dimensional space (e.g., air or water). The launch may include a motion, a movement, or an orientation change in addition to the initial change in position. A movement included in the launch may reflect the user throwing the drone to cause the drone to ascend into the air, ascend into the air with a rotation (e.g., a vertical rotation, a horizontal rotation, or a rotation about two or more axes), move in a parabolic path, move in a horizontal direction, or move in a vertical direction. For example, the user may throw the drone in a vertical motion or substantially vertical motion. By way of another example, the user may toss or throw the drone in an arcing or parabolic path combined with a horizontal rotation (e.g., a spin or a flat spin).

In some embodiments, the movement of the drone may cause the sensor input to be identified. The drone may be initialized prior to launch, such that the user turns on the drone before throwing the drone into the air. The sensors may identify the sensor input based on a movement threshold. In some instances, the movement threshold is a position threshold representing a change in position greater than a specified distance in one or more axes. The movement threshold may be a speed threshold representing a change in a speed of travel of the drone greater than a specified speed. The movement threshold may also be a velocity threshold representing a change in one or more of a speed and a direction (e.g., represented by a change in position) within one or more axes. In embodiments where the sensors identify the sensor input based on a movement threshold, all or a portion of the components of the drone may be in a low power mode or turned off prior to receiving the sensor input. The sensor component 210 may be in a low power mode, awaking or initializing one or more components of the drone upon identifying the sensor input. In some instances, the sensor component 210 may be initialized after launch by a client device remote from the drone, such as a mobile computing device or remote control operated by the user after launch of the drone.

Although described above with respect to sensory information quantifying movement of the drone within a three dimensional space, in some embodiments the sensory information comprises a gesture of an operator of the drone. The sensor component 210 may be initiated upon reaching, being operated to, or being positioned in a suitable position to observe gestures of the operator. For example, the drone may be operated or automatically maneuver itself to a position at which the image capture device coupled to the drone is a suitable distance from the operator to capture the operator within a field of view of the image capture device. In such instances, an image capture device coupled to the drone may identify the operator of the drone within a field of view of the image capture device. Upon identifying the operator, the image capture device may identify one or more movements of the operator.

Example embodiments incorporating modes of controlling a drone with gestures, actions, user identification, combinations thereof, and other suitable image based controls may incorporate the camera or other image capture device to identify and track the visual aspects within the field of view to pass as control signals to other components of the drone. Once initiated, the image capture device or camera may search for and identify the user in a field of view in cooperation with flight components or steering components of the drone. After identifying the user in the field of view, the methods and systems of the present disclosure cause the image capture device to maintain the user in the field of view, at least periodically, as the drone performs maneuvers corresponding to the visual control aspects.

Although described above with respect to sensory information quantifying movement of the drone within a three dimensional space, in some embodiments the sensory information comprises a gesture of an operator of the drone. In such instances, a sound sensor (e.g., a microphone) communicatively coupled to the drone may receive or detect a sound emanation. The sound emanation may be received within an audio stream and comprise one or more elements. The sensor component 210 may identify a portion of the sound emanation as a voice of an operator. In some instances, the sensor component 210 identifies a voice command within the portions of the sound emanation corresponding to the voice of the operator.

In some embodiments, identification and reception of voice commands may occur via an onboard microphone incorporated in the drone. The sensor component 210 may, in such cases, be configured automatically to discriminate between different voices that may be present in an audio stream picked up by the drone microphone. The sensor component 210 may select a particular one of the voices as an operator voice, and execute voice-triggered functions exclusively responsive to commands in the selected operator voice. The sensor component 210 may also be configured to discriminate between voices and ambient sound or noise within the audio stream.

In selecting the operator voice, the sensor component 210 may be configured to automatically select the operator voice based on automated voice recognition. A voice signature or set of voice characteristics may in such embodiments be associated with the current operator of the drone, with an audio stream received by the drone microphone being compared with the voice signature to extract from the audio input spoken commands issued by the operator. In such embodiments, a user interface mechanism for the drone may provide preflight functionality for setting or changing the operator.

In some embodiments, the sensor component 210 is configured to select the operator voice dynamically or on the fly. In such instances, the selection enables in-flight mobile control of the drone without preflight designation of a particular user as the operator. In some such embodiments, the operator voice may be selected based on voice the loudness, as represented in an audio stream detected by the sensor component 210. In particular, the loudest received voice is in some embodiments automatically selected as the operator voice to which the drone responds exclusively. Operator voice selection may also be based on identifying a voice source closest to the sensor component 210. This can in some embodiments be achieved by determining a respective source location for each of a plurality of voices in the audio stream, and selecting as operator voice that voice which corresponds to the voice source closest to the sensor component 210.

In some instances, identifying voice source location is based on processing audio streams from a plurality of spaced microphones, thereby enabling triangulation of the source location for each voice represented in the audio streams. The plurality of microphones may include two or more microphones selected from the group comprising: (a) the microphone carried by the drone (e.g., the sensor component 210), (b) respective microphones carried by one or more other drones within audio range, (c) a microphone incorporated in a mobile electronic device (such as a mobile phone) carried by the operator, and (d) a dedicated drone-control microphone separate from and communicatively coupled with the drone.

Operator voice identification or selection may also include processing of the audio stream with a synchronized video stream. The video stream may in such cases be processed automatically to identify as operator a particular one of a plurality of persons represented in the video stream. Such identification may comprise automated facial recognition, object recognition (e.g., to recognize a predefined visual identifier associated with the operator), or automated feature recognition to identify a distinctive visual feature (e.g., a particular color of clothing) associated with the operator. In one example embodiment, for instance, the drone is configured automatically to identify, upon manual launch, a person performing the launch as the operator, to identify at least one distinctive visual feature of the operator (e.g., a distinctly colored article of clothing worn by the operator), and thereafter automatically to track the operator based on automated recognition of the distinctive visual feature.

Voice identification based in part on processing of the video stream may comprise automatically recognizing facial speech movements by the operator, and identifying as operator-issued commands or as the operator voice those vocal components of the audio stream that are synchronous with the automatically recognized facial speech movements of the operator.

The capture of image information or a video stream employed for such voice discrimination purposes may in some embodiments be performed using an auxiliary camera incorporated in the drone in addition to its primary camera. The auxiliary camera may in some embodiments be configured and oriented to substantially continually capture a video stream in which the operator is visible. In one example embodiment, the auxiliary camera is a wide angled camera, for example having a viewing angle of greater than 150° in two orthogonal directions. The viewing angles of the auxiliary camera may in some embodiments be approximately 180°, or greater. In a particular example embodiment, such a wide angled auxiliary camera is mounted on an operatively lower side of a drone body, so that the auxiliary camera effectively captures visual information on everything beneath the drone.

The auxiliary camera may be fixedly mounted on the drone body, to have a fixed orientation relative to the drone body. Instead, the auxiliary camera may be movably mounted on the drone body, the drone including an automated tracking system configured to dynamically move the auxiliary camera so as to track the person and/or face of the operator. The auxiliary camera is in such embodiments locked on to the face or person of the operator, and remains focused on the operator regardless of the movement of the drone. Such automated tracking may be achieved in some embodiments by automated facial and/or object recognition based on the video stream captured by the auxiliary camera itself. In other embodiments, the operator may be tracked based on a beacon device carried by the operator and/or based on location information automatically communicated from a mobile user device (e.g., a mobile phone enabled with local/global positioning system functionality) to the drone by means of a communication link between the mobile device and the drone.

In some embodiments, the onboard microphone of the drone may be a unidirectional microphone movably mounted on the drone body. A unidirectional microphone is primarily sensitive to sounds from a particular direction. Such a unidirectional microphone may in some embodiments comprise a shotgun microphone or a parabolic microphone.

The drone may in such cases include a microphone directing system configured automatically to point the microphone towards the designated or identified operator. In operation, the directional microphone is thus constantly directed towards the operator, so that an audio stream captured by the directional microphone includes essentially no significant voice stream other than that of the operator. In some such instances, speech command recognition may be performed without voice discrimination or recognition, as described previously. Automated tracking of the operator location, in order to achieve continuous pointing of the directional microphone at the operator, may in some embodiments be performed based on automated image processing as described elsewhere herein.

Instead of, or in addition to capturing audio for speech control purposes, the system may in some embodiments include an off-board microphone separate from the drone to capture audio streams containing spoken operator commands. The off-board microphone may be a portable microphone to be carried by the user.

In some embodiments, the off-board microphone is a special-purpose microphone dedicated for operation with the drone and the sensor component 210, for example being provided with the drone as part of a drone kit. In such cases, the special-purpose off-board microphone may serve as an audio remote control device for the drone. Such an audio remote control device may in some embodiments be a solitary or exclusive remote control device forming part of the drone kit. In other embodiments, the off-board microphone may be provided for spoken remote control in addition to another remote control device, such as a haptic remote control. In some embodiments, the off-board microphone may be incorporated in a haptic remote control device by which at least some functions of the drone may be controlled through operation of conventional toggles, buttons, bumpers, control sticks, and the like.

The off-board microphone is in each of these cases communicatively coupled to the drone, for real-time communication of operator commands to the drone. In some embodiments, audio processing for identifying spoken commands is performed exclusively at the drone by one or more onboard processors. In other embodiments, the audio processing is performed exclusively by off-board processors physically separate from the drone and communicatively coupled to the drone. In yet further embodiments, an audio processing load may be shared between off-board and onboard processors.

The off-board processors may in some embodiments be incorporated in a device carrying the off-board microphone. As will be described below, the off-board microphone is in some instances provided by a mobile phone of the operator, in which case a part or all of the audio processing functions may be performed by the mobile phone.

As mentioned, audio stream capturing for voice control purposes is in some embodiments performed by use of a native microphone integrated in a mobile phone of the user. The mobile phone may in such instances execute an application for enabling operator control of the drone via the mobile phone. Note that at least some of the functions described previously with respect to the drone's onboard microphone (such as automated voice identification and speech recognition) may in such cases be performed with respect to an audio stream captured by the mobile phone microphone.

The mobile phone may be configured by the drone control application executed thereon to capture image data of the operator via a native camera incorporated in the phone, and to identify and execute spoken commands based at least in part on the image data. For example, voice and speech recognition may be based at least in part on an audio stream and a video stream captured by the mobile phone in some embodiments where synchronized image processing and audio processing is employed to match captured speech to corresponding mouth movements of the operator. In some instances, the mobile phone may capture one or more images or video stream of the operator and perform one or more facial recognition operations. The mobile phone may pass the image or a portion of the video stream, along with an indication of the identified operator to the sensor component 210 of the drone. The sensor component 210 of the drone may compare the data received from the mobile phone and match the operator identified within the field of view of the image capture device of the drone. In such instances, the sensor component 210, using the image capture device, may perform independent facial recognition operations to identify the operator or match facial characteristics of the person in the field of view with facial characteristics identified from the video stream of the mobile phone.

In some embodiments, the drone is camera (e.g., image capture device) enabled, with at least some functions of an onboard camera incorporated in the drone being controllable by user-issued voice commands. These voice-controllable camera functions may include switching the camera between respective modes for capturing videos or photos (i.e., still images); triggering or stopping image capture, and identifying a focus object or person. Voice commands may also control movement and/or positioning of the drone. Thus, for example, the drone may be configured to automatically change an altitude responsive to user-issued voice commands to move up or down.

In operation 420, the movement component 220 determines one or more movement attributes from the sensor input. In embodiments where the sensor input comprises movement of the drone within a three dimensional space, the one or more movement attributes may comprise one or more of a lateral movement, a vertical movement, a parabolic movement, a spin, a rotation, or other definable portions (e.g., directions and speeds) of the drone. The one or more movement attributes, in combination, may represent a launch, throw, or flight path of the drone.

In some embodiments, the movement component 220 determines the movement attributes by identifying component movements (e.g., vertical, horizontal, rotational, and speed attributes of the launch) of the sensor input. In such embodiments, the movement component 220 may receive, from the sensor component 210, the sensor input or selected information from the sensor input. The sensor input or selected information may comprise values associated with one or more of a distance (e.g., a position change), a speed, a velocity, a rotation, a rotational speed, a force, combinations thereof, or any other suitable values quantifying one or more movement elements of the sensor input. In some instances, the sensor input or selected information comprises relative values. The relative values represent quantifiable changes in one or more of a position, direction, speed, or velocity of the drone, where the drone was already in motion prior to receiving the sensor input.

Upon receiving a set of values comprising the sensor input, the movement component 220 identifies one or more values, from the set of values, which correspond to a set of movement attributes within a memory or storage device accessible by the movement component 220. The movement component 220 then determines the one or more movement attributes matching values received within the sensor input. For example, the movement component 220 may receive values within the sensor input indicating movement of the drone in a parabolic arc (e.g., a value indicating a vertical velocity and a horizontal velocity) with a horizontal rotation (e.g., a value indicating revolutions per minute in a horizontal plane or a tangential speed). The movement component 220 determines at least two movement attributes indicating the parabolic arc and the rotation of the drone.

As described above, the movement component 220 may determine the movement by separating, calculating, or otherwise determining values for a current movement of the drone, or salient portions of the movement of the drone. In some instances, the movement component 220 may determine the one or more movement attributes by identifying a subset of sensors, of the sensor component 210, receiving or identifying values from the sensor input. The movement component 220 then determines the one or more movement attributes by matching one or more of the values and the subset of sensors with movement attributes of the set of movement attributes accessibly by the movement component 220.

In embodiments where the sensor input comprises a gesture, the movement component 220 determines the one or more movement attributes from the sensor input. In some embodiments, the movement component 220 cooperates with the sensor component 210 to identify the gesture from a set of predefined gestures. The one or more movement attributes may correspond to an intensity of the gesture. For example, where the gesture includes the operator raising a hand in the air to indicate a change in altitude, the movement component 220 may determine a distance traversed by the hand to identify the intensity value for the gesture. The intensity value may be relative, determined from a speed, a distance, or other suitable characteristic of the gesture. In some instances, the intensity value is predefined, such that the movement component 220 and the sensor component 210 measure the intensity of the gesture (e.g., a distance or a rate of speed) and select an intensity value corresponding to a measure closest to the measure determined for the gesture. The movement component 220 may determine the one or more movement attributes corresponding to the gesture identified from the set of predefined gestures. For example, one gesture may be associated with a vertical distance, while another gesture is associated with a speed and a horizontal distance.

In embodiments where the sensor input comprises a sound emanation representing a voice command, the movement component 220 determines the one or more movement attributes from the sensor input. The movement attributes may correspond to one or more characteristics of the voice command, a voice issuing the voice command, an audio stream, or the sound emanation. Characteristics may comprise a volume, a pitch, a speed, and keywords. For example, keywords may include words associated with performance of maneuvers, such as quickly, slowly, now, fast, faster, higher, lower, or any other suitable keyword indicating one or more of a type of movement or a manner in which a movement is to be performed. In some instances, the movement component 220 cooperates with the sensor component 210 to identify the voice command from a set of predefined voice commands. The movement component 220 may then select the one or more movement attributes corresponding to the voice command identified from the set of predefined voice commands.

In operation 430, the maneuver component 230 selects one or more maneuvers corresponding to at least one movement attribute. In some embodiments, the movement component 220 selects the one or more maneuvers in response to the one or more movement attributes being determined from the sensor input. In some embodiments, one or more components of the drone determines a reference point within the three dimensional space. In some instances, the reference point is determined by one or more of the sensor component 210, the movement component 220, the maneuver component 230, or the image control component 250. The reference point may be at or proximate to the operator, such as embodiments in which the sensor input comprises, at least in part, gestures of the operator.

In some embodiments, the one or more maneuvers correspond to commands (e.g., voice commands, motion commands, gesture commands, or combinations thereof) defined within a memory of the drone. For example, the one or more maneuvers may include homing commands, altitude commands, movement commands, hold commands, follow commands, search commands, combination maneuvers, image capture commands, combinations thereof, and other suitable commands. Commands may be predetermined or preprogrammed, user programmable prior to operation of the drone or a session operating the drone, or dynamically programmable based on combinations of commands, motions, or other input during operation of the drone. After selecting the one or more maneuvers corresponding to a received command, such as a gesture or voice command, the maneuver component 230 may select a maneuver characteristic (e.g., an intensity, a speed, a height, or other manner of performing the one or more maneuvers) corresponding to the intensity value identified by the movement component 220.

For example, a predefined homing commands may be responsive to a position of the user and a position of the drone. In such instances, once a homing commands is issued, the drone automatically returns to a specific homing location. In some embodiments, the homing location corresponds to the current location of the operator, which may be recognized by automated object recognition performed with respect real-time image data captured by the drone. Further, the homing location may be global positioning system (GPS) coordinates, a location, or an address entered into or provided to the drone. The homing location may also be a device location, such as a current location of a wearable computing device (e.g., a smartwatch or smartglasses) or a mobile computing device (e.g., a smartphone or tablet computing device). In such instances, the device and device location may correspond or be proximate to the user operating the drone. The homing location may also be indicated by a homing beacon or by automatic identification by the drone of a last launch location of the drone. The maneuver characteristic, selected from the intensity value of the gesture or voice command, may correspond to a manner in which the drone is to perform the one or more maneuvers. For example, where the gesture or voice command indicates a homing command and the maneuver characteristic indicates a height at which the homing command is to be performed, the drone may ascend to a height corresponding to the maneuver characteristic and execute the homing operation at the indicated height.

In operation 440, the flight component 240 executes the one or more maneuvers by controlling the one or more drone control components to move the drone within the three dimensional space. In instances where the drone is an aerial drone, the flight component 240 selectively manipulates one or more flight components (e.g., the one or more drone control components) of the drone to execute the one or more maneuvers. In such instances, the flight component 240 may control one or more of a throttle, rotors, ailerons, elevators, rudders, spoilers, flaps, slats, air brakes, combinations thereof, or any other suitable flight components. In embodiments where the drone is a land based drone, the flight component 240 selectively manipulates one or more drive components (e.g., the one or more drone control components) of the drone to execute the one or more maneuvers at or near a ground level. The one or more drive components may comprise a motor, one or more wheels, one or more steering mechanism, a throttle, treads, combinations thereof, or any other suitable components configured to manipulate a position of the drone at or near ground level. Although described with respect to control components for an aerial drone and a land-based drone, it should be understood that the flight component 240 may manipulate control components of any suitable drone to manipulate a position of the drone in three dimensional space or within one or more dimension of the three dimensional space. In embodiments where the components of the drone have determined a reference point, as described above, the flight component 240 executes the one or more maneuvers in relation to the reference point, as described in more detail below.

Figure 5:
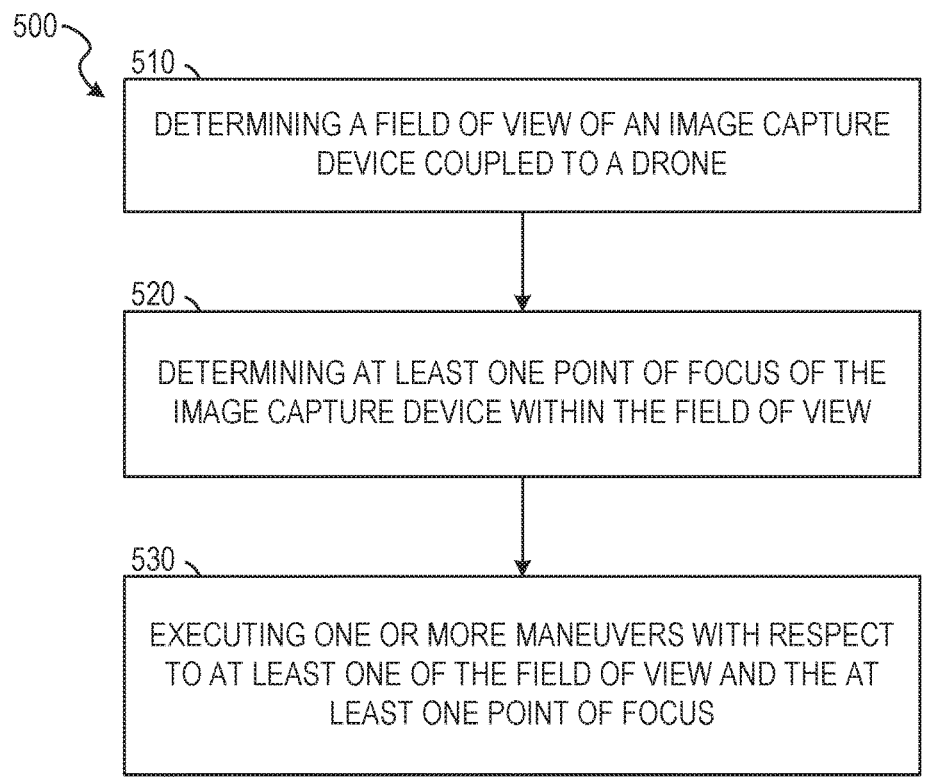
FIG. 5 is a flow diagram illustrating an example method for control of a remote device, according to some example embodiments.

FIG. 5 depicts a flow diagram illustrating an example method 500 for controlling a device remote from an operator. The operations of method 500 may be performed by components of the control system 160. In some instances, certain operations of the method 500 may be performed using one or more operations of the method 400 or as sub-operations of one or more operations of the method 400, as will be explained in more detail below.

In operation 510, the image control component 250 determines a field of view of an image capture device. In some embodiments, the image capture device is a part of the drone. In such embodiments, the image capture device may be part of the drone by being integral to the drone, coupled to the drone (e.g., mounted to an exterior surface of the drone), coupled to the drone using an independently movable mount, or any other suitable manner of inclusion. The image control component 250 may determine the field of view by accessing one or more characteristics of the image capture device. The image control component 250 may also calculate the field of view of the image capture device from one or more of the characteristics of the image capture device, a level of magnification of the image capture device (e.g., a current magnification level or an available magnification level), one or more components of the image capture device (e.g., an image sensor of the image capture device), and a focal length for the image capture device.

In some instances, the image control component 250 determines the field of view by identifying one or more objects of interest within the field of view. In such instances, the image control component 250 may identify the objects or interest, a size of the objects of interest, and a relative size or scale of the objects of interest to one or more other aspects depicted within the field of view. In some embodiments, the objects of interest may be determined based on an object mode of the image capture device. For example, the object mode may be selected from scene, person, face or portrait, still life, night vision, low light, or any other suitable mode. Each mode may correspond to an object type corresponding to a type of object to be detected by the image capture device. For example, the person mode may configure the image capture device to identify people as objects of interest and determine the field of view or objects for inclusion in the field of view based on persons perceivable by the image capture device.

In operation 520, the image control component 250 determines at least one point of focus of the image capture device within the field of view. In some embodiments, the point of focus corresponds to an object of interest within the field of view. In such instances, the image control component 250 may select one or more objects among the one or more objects of interest as a point or points of focus for the image capture device. The image control component 250 may also determine the point of focus as an object or aspect, within the field of view, on which the image capture device may suitably focus. For example, where the field of view is large and the image capture device is distant from a person depicted within the field of view, such that a clear image may not be captured of the person, the image control component may select another aspect as the point of focus.

Although described as automatically determining a point of focus, in some instances, the point of focus is determined based on one or more input. The one or more input may reflect the mode of the image capture device, such as a person mode. The point of focus may be determined to correspond to the mode. For example, where the mode is a person mode, the image control component 250 may determine one of the persons (e.g., objects of interest) identified within the field of view as the point of focus for the image capture component.

The image control component 250 may also determine the point of focus based on an input of the operator. In such embodiments, the image control component 250 identifies a point of focus selected by the operator. The image control component 250 may receive the selection via a user interface presented on a mobile phone, a wearable computing device (e.g., a smart watch), a gesture, or a voice command of the operator. The image control component 250 may also identify the point of focus as an object, an object type, or a location, corresponding to an initial movement of the drone, as described above. Where the input is received through a user interface of the mobile phone or the wearable computing device, a screen may present a real-time preview depicting the field of view of the image capture device. The operator may tap on the screen to select a point of focus. In embodiments where the operator input is a gesture, the image control component 250 may select the point of focus as a point to which the operator is pointing or otherwise indicating through a gesture. The image control component 250 may identify the point of focus corresponding to a verbal command, such as selecting the point of focus as an object, a point in space, a person, or a color stated by the operator. In some instances the image control component 250 may cooperate with the flight component 240 to maneuver the drone to a position suitable to focus on the selected point of focus.

In operation 530, the flight component 240 executes the one or more maneuvers with respect to at least one of the field of view and the at least one point of focus of the image capture device. The flight component 240 may execute the one or more maneuvers in a manner similar to that described above with respect to operation 440. In some embodiments, the flight component 240 executes the one or more maneuvers with respect to the field of view and the point of focus by maintaining a selected distance from the point of focus. The flight component 240 may also execute the one or more maneuvers by maintaining a dynamically determined distance from the point of focus; maintaining the field of view of the image capture device; maintaining an object of interest (e.g., the point of focus) within the field of view or in a specified focus value; causing a change in one or more of the field of view and a focus value relative to the point of focus; combinations thereof; or any other suitable manner of execution. Where the flight component 240 executes the one or more maneuvers to cause a change relative to the point of focus, the flight component 240 may cause the drone to move in a manner that depicts an object of interest as moving into or out of the field of view in a manner specified by the maneuver. For example, the maneuver may cause the flight component 240 to control the drone to cause the object of interest and point of focus to move into a frame (e.g., field of view), travel across the frame, and exit the frame on an opposing side, such as panning across a static object.

Figure 6:
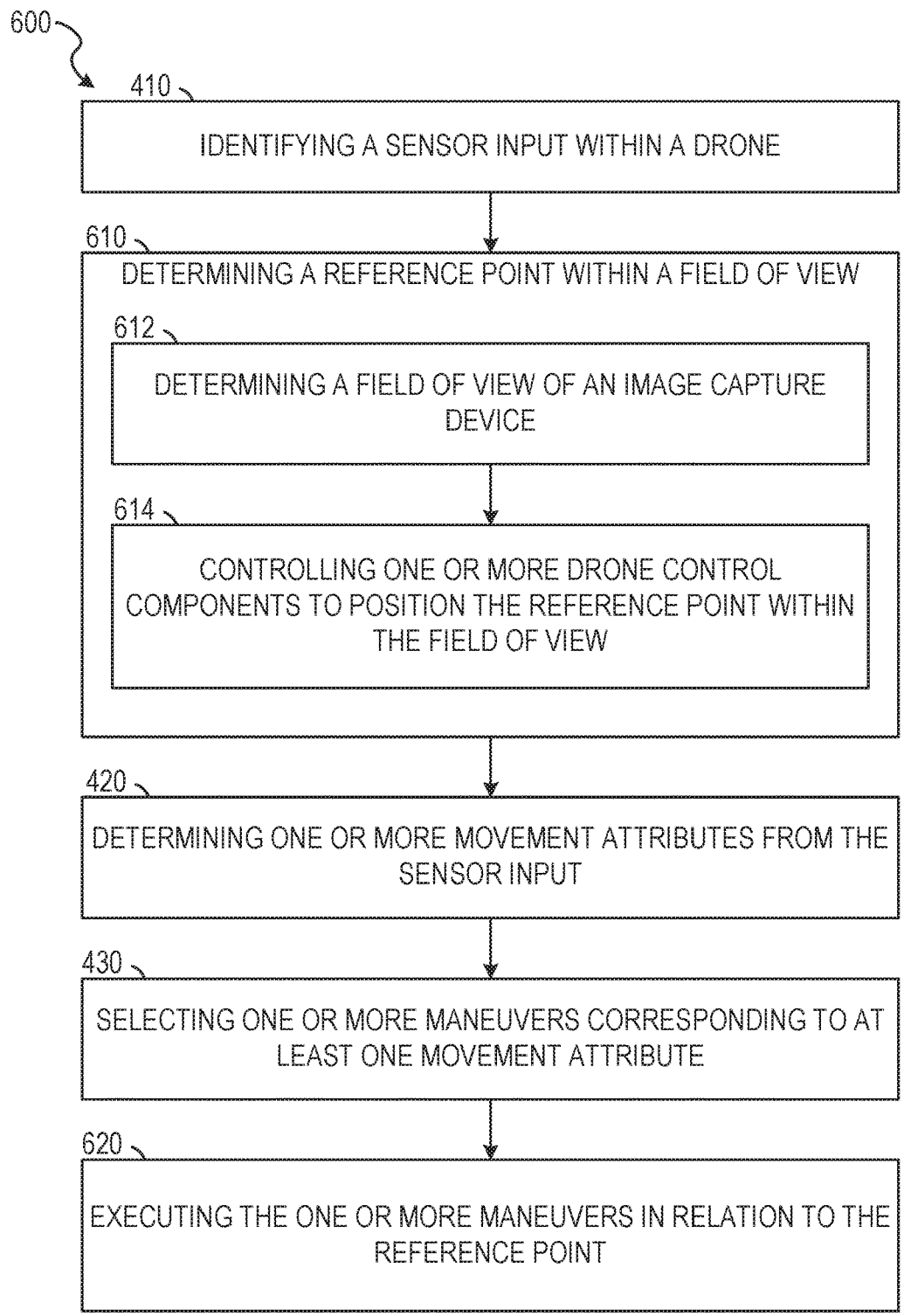
FIG. 6 is a flow diagram illustrating an example method for control of a remote device, according to some example embodiments.

FIG. 6 depicts a flow diagram illustrating an example method 600 for controlling a device remote from an operator. The operations of method 600 may be performed by components of the control system 160. In some instances, certain operations of the method 600 may be performed using one or more operations of the method 400 or the method 500 or as sub-operations of one or more operations of the method 400 or the method 500, as will be explained in more detail below. For example, as shown in FIG. 6, in some embodiments, the method 600 may be performed by initially executing operation 410 to identify a sensor input within a drone.

In operation 610, one or more of the movement component 220 and the image control component 250 determine a reference point within the three dimensional space. The movement component 220 and the image control component 250 may cooperate to determine the reference point as a point within the field of view of the image capture device (e.g., a position of an object of interest). In some instances, the reference point is determined independent of the field of view of the image capture device. In such instances, the reference point may be selected as a GPS position, a coordinate position, a location of a mobile computing device (e.g., the mobile phone or the wearable computing device) of the operator, or any other suitable location. In some embodiments, the movement component 220 determines a current location of the drone or determines the current location of the drone relative to the reference point. In some instances, the movement component 220 cooperates with the flight component 240 to position the drone at a subsequent position, spaced a distance away from the current location of the drone, to place the drone and the image capture device in an orientation suitable for observing the reference point within the field of view of the image capture device.

In operation 612, the image control component 250 determines a field of view of the image capture device. As referenced above, in some embodiments, the operation 610 is performed using one or more operations or sub-operations. In some instances, the image control component 250 determines the field of view of the image capture device in a manner similar to or the same as described above with respect to operation 510.

In operation 614, the flight component 240 controls the one or more drone control components to position the reference point within the field of view of the image capture device. In some embodiments, the flight component 240 controls the drone within three dimensional space to move the drone to the reference point, to a location proximate to the reference point, or to a location at which the reference point is observable within the field of view. In some embodiments, the flight component 240 controls the drone control components and a camera position component to modify an orientation or position of the drone and an orientation or direction of the image capture device coupled to the drone. Where the reference point corresponds to an object of interest, one or more of the image control component 250 and the sensor component 210 may perform object recognition tasks to identify the object of interest and verify the object of interest is within the field of view of the image capture device. Where the reference point corresponds to a location, one or more of the image control component and the sensor component 210 may identify coordinates viewable within the field of view of the image capture device and match one or more coordinates within the field of view to the reference point.

As shown in FIG. 6, in response to determining the reference point in the field of view, in operations 610, 612, and 614, in some embodiments, the movement component 220 determines one or more movement attributes from the sensor input, similar to or the same as the manner described above in reference to operation 420. In some instances, the maneuver component 230 then selects one or more maneuvers corresponding to at least one movement attribute determined by the movement component 220. The maneuver component 230 may select maneuvers in a manner similar to or the same as described above with respect to operation 430. In some embodiments, the maneuvers are selected as corresponding with the at least one movement attribute and relative to the reference point and the field of view. In such embodiments, the maneuvers may be selected with the reference point as a center around which or relative to which the maneuvers will be executed. For example, where a selected maneuver is a circular flight path, the reference point may be designated as a center point around which the drone will revolve during the circular flight path maneuver.

In operation 620, the flight component 240 executes the one or more maneuvers in relation to the reference point. In some embodiments, the one or more maneuvers are executed while maintaining at least a portion of the reference point within the field of view of the image capture device. In some embodiments, the flight component 240 executes the one or more maneuvers in a manner similar to or the same as described above with respect to operation 530. The flight component 240 may execute the one or more maneuvers to maintain a distance from the point of reference, modify one or more of a distance and an orientation of the drone relative to the reference point, maintain the reference point within the field of view of the image capture device, or perform any other suitable maneuver.

In some embodiments, the drone is configured automatically to center on and track a particular user identified as operator of the drone, such that a position of the operator is the reference point. Once centered and tracked, the drone may execute the maneuvers in relation to the operator. In some embodiments, the maneuvers are performed with a distance between the operator and the drone being fixed. In some embodiments, the distance between the operator and the drone is automatically variable responsive to operator-issued voice, gesture, or motion commands to come closer or to go further. In a particular example embodiment, the drone may be commanded in-flight by a spoken tracking command (e.g., "follow me"), responsive to which the drone camera is automatically focused on the operator, and, when the operator moves around, the drone autonomously moves to keep the operator within the scene captured by the camera.

Figure 7:
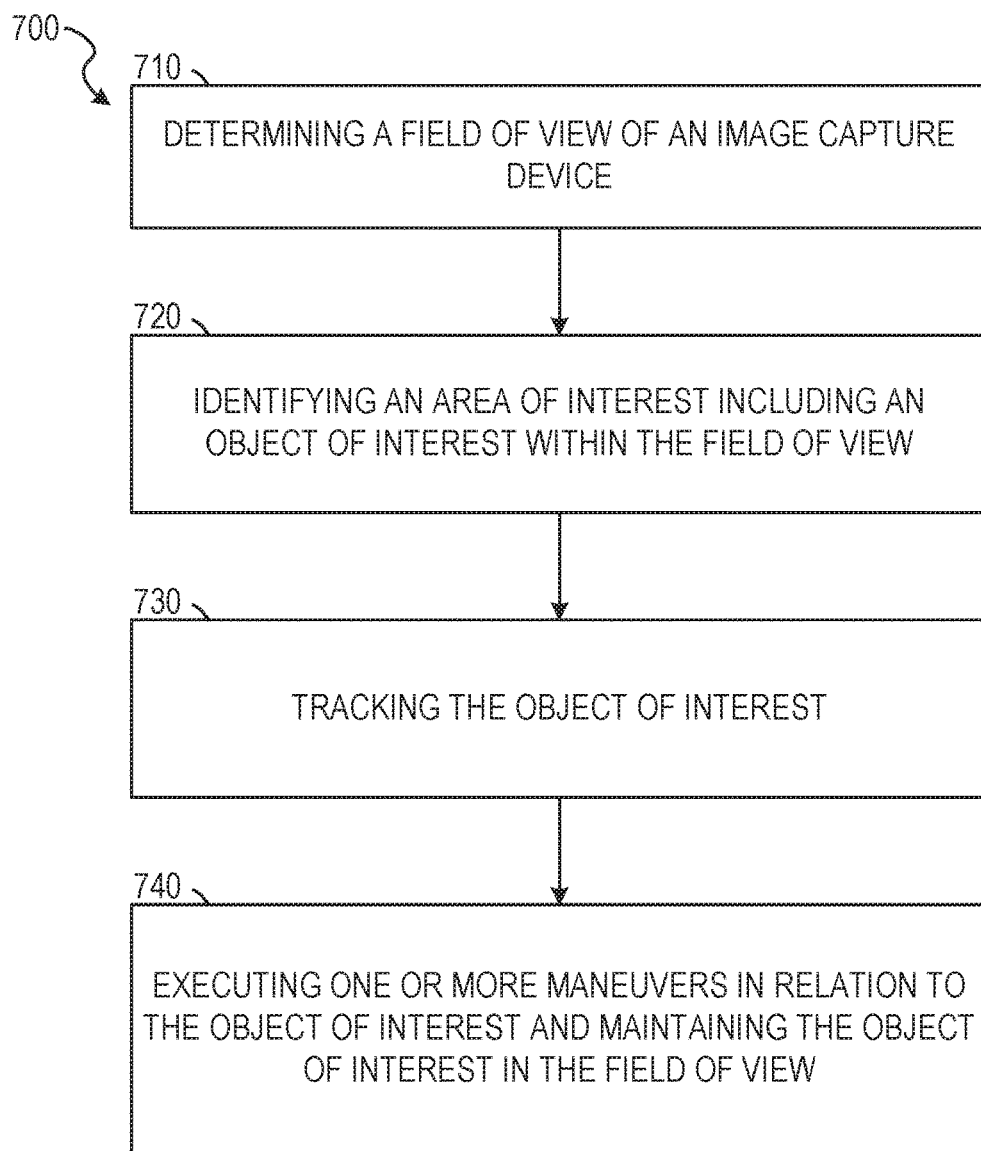
FIG. 7 is a flow diagram illustrating an example method for control of a remote device, according to some example embodiments.

FIG. 7 depicts a flow diagram illustrating an example method 700 for controlling a device remote from an operator. The operations of method 700 may be performed by components of the control system 160. In some instances, certain operations of the method 700 may be performed using one or more operations of the method 400, 500, or 600 or as sub-operations of one or more operations of the method 400, 500, or 600, as will be explained in more detail below.

In operation 710, the image control component 250 determines a field of view of the image capture device. In some embodiments, the field of view may be determined in a manner similar to or the same as described above with respect to operations 510 and 612.

In operation 720, the image control component 250 identifies an area of interest within the field of view. In some embodiments, the area of interest includes at least one object of interest. The area of interest may represent a coordinate or set of coordinates depicted within the field of view for the object of interest, surrounding the object of interest, a position with which the object of interest is interacting or will interact, or any other suitable area of interest. In some instances, the area of interest is a bounded area within a depiction of the field of view of the image capture device. In such instances, the area of interest may correspond to a position on a display device at which the object of interest is or is to be depicted. Where the area of interest corresponds to a position on the display device, the area of interest may be assigned a pixel location, a set of pixel locations, a set of coordinates on the display device, or any other suitable measure of position within a depicted field of view.

In operation 730, the image control component 250 tracks the at least one object of interest. In some embodiments, the image control component 250 tracks the at least one object of interest by maintaining the object of interest within the field of view of the image capture device. The image control component 250 may also track the object of interest by maintaining the object of interest in the area of interest, where the area of interest is a position on the display device.

In operation 740, the flight component 240 executes the one or more maneuvers in relation to the at least one object of interest. As described above, the flight component 240 may execute the one or more maneuvers to maintain the object of interest within the area of interest, in the field of view or at a location on the display device. The flight component 240 may execute the one or more maneuvers to generate an effect, such as a panning, swooping, zooming, or other suitable motion. The motion effect generated by the flight component 240 may cause the object of interest to be present and depicted within the field of view and the area of interest for at least a period of time or a set of frames within a video stream.

Figure 8:
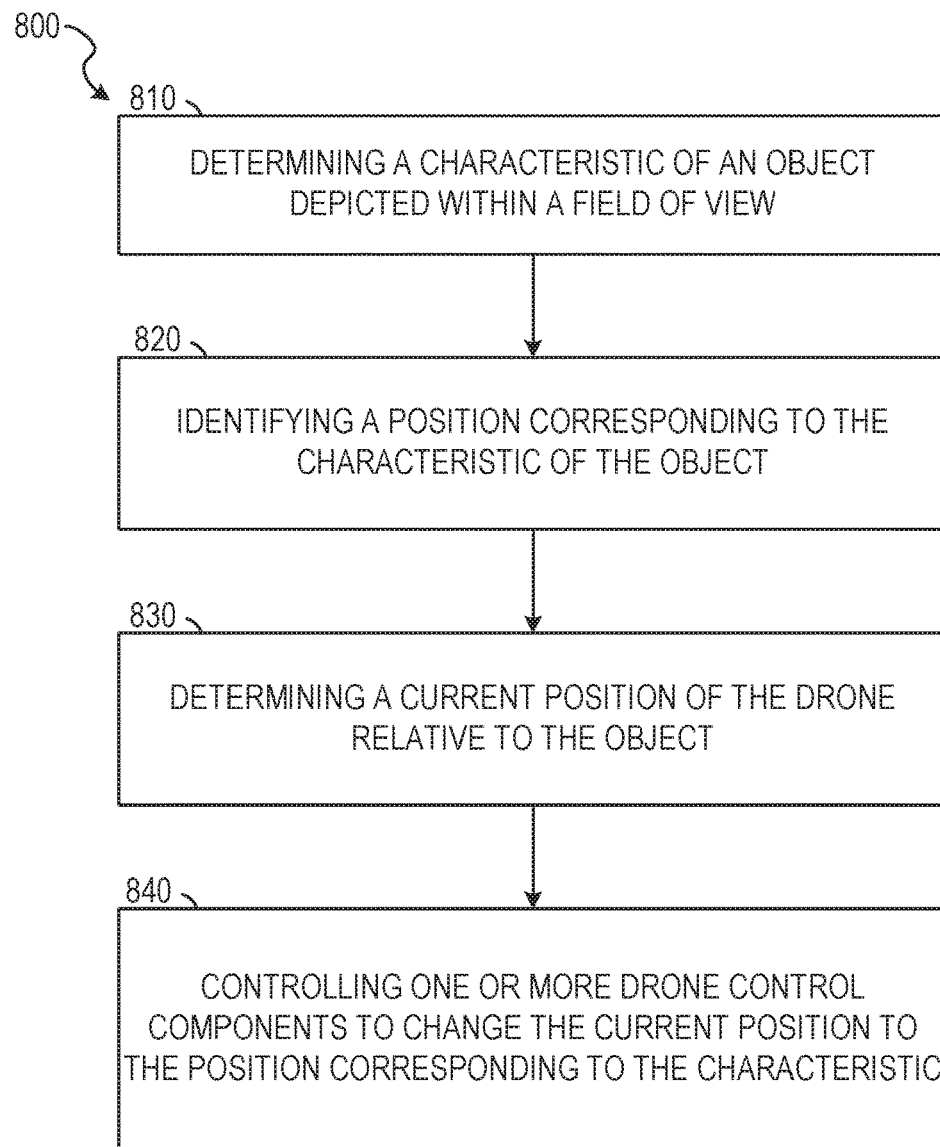
FIG. 8 is a flow diagram illustrating an example method for control of a remote device, according to some example embodiments.

FIG. 8 depicts a flow diagram illustrating an example method 800 for controlling a device remote from an operator. The operations of method 800 may be performed by components of the control system 160. In some instances, certain operations of the method 800 may be performed using one or more operations of the method 700 or as sub-operations of one or more operations of the method 700, as will be explained in more detail below.

In operation 810, the image control component 250 determines a characteristic of an object of interest depicted within the field of view of the image capture device. In some embodiments, the object of interest is a person at least partially depicted within the field of view of the image capture device. The characteristic may be one or more of a color (e.g., a shirt color, a pants color, a jacket color), a shape (e.g., a size of the object, dimensions of the object, or a body type of a person), an orientation (e.g., sitting, lying down, standing, facing the drone, facing away from the drone), a position, a posture, a facial expression, an emotional state, or any other suitable characteristic of the object of interest. In some embodiments, in determining a characteristic of the object of interest, the image control component 250 may initially identify the object of interest within the field of view. Identification of the object of interest may be performed using one or more one or more image recognition, facial recognition, shape recognition, edge detection, or other suitable operations configured to identify one or more of an object and a type of object within the field of view. The object of interest detection may be performed similar to or the same as described above with respect to operations 520, 720, or 730. In some embodiments, the characteristic may be determined based on elements or aspects of the object of interest used by the image, face, shape, or edge recognition operations to identify or segment the object of interest within the field of view.

In operation 820, the maneuver component 230 identifies a position corresponding to the characteristic. In some embodiments, the position relative to the characteristic corresponds to an orientation of one or more of the drone and the image capture device coupled to the drone. The orientation may be relative to the object of interest based on the characteristic. In such embodiments, the maneuver component 230 identifies the orientation based on one or more of a current location of the drone, a current location of the object of interest, the field of view of the image capture device, and the characteristic identified for the object of interest. In some embodiments, the orientation identified by the maneuver component 230 is an angle at which the object of interest, or a selected portion of the object of interest, will be visible within the field of view of the image capture device. For example, where the object of interest is a person and the characteristic identifies the person as being seated, the maneuver component 230 may identify the orientation as an angle at which the person of interest is wholly, or partially, within the field of view of the image capture device. The maneuver component 230 may also identify an angle at which a suitable portion of the object of interest, such as a face is visible within the field of view. For instance, the maneuver component 230 may identify one or more of a vertical position and a horizontal position of the drone at which the face of the person, or a suitable percentage of the face, will be visible within the field of view. Such vertical and horizontal positions may place the drone at an angle such that the field of view of the image capture device depicts more of the face of the seated person than a top of the seated person's head.

In operation 830, the maneuver component 230 determines a current position of the drone relative to the person depicted within the field of view. The maneuver component 230 may determine the current position of the drone using GPS coordinates, a map, a location of the person, a location of a device (e.g., mobile phone or smart watch) associated with the person, or any other suitable coordinates or location information. The maneuver component 230 may determine the current position as a distance, vertical and horizontal, from the position of the person. In some instances, the maneuver component 230 determines the current position of the drone and the position of the person in a three dimensional coordinate system.

In some instances, the maneuver component 230 determines the current position relative to the characteristic identified for the person. In such embodiments, the maneuver component 230 may determine the current position of the drone, the current position of the person, and a position suitable for capturing all, or a portion of interest of the person, within the field of view of the image capture device. For example, as described above for a seated person, the maneuver component 230 may determine a position at which the seated person is wholly depicted within the field of view of the image capture device. Similarly, the maneuver component 230 may determine a position at which the face of the person will be depicted within the field of view, where the characteristic indicates that the person is currently facing away from the drone.

In operation 840, the flight component 240 controls the one or more drone control components to change the current position of the drone to the position corresponding to the characteristic. The flight component 240 may control the drone automatically to position the drone at a subsequent position, as described above. For example, once a subsequent position is determined by the maneuver component 230 which places the face of the seated person within the field of view of the image capture device, the flight component 240 may determine a course or a series of movements or maneuvers suitable to translate the position of the drone from the current position to the subsequent position. The series of movements may transfer the drone from the current position to the subsequent position directly or based on a calculated efficiency for the change in position. For example, the maneuver component 230 may determine a flight path that moves the drone from the current position to the subsequent position with optimal (e.g., theoretically optimal) efficiency with respect to battery power or fuel of the drone.

In some embodiments, changing the position of the drone comprises one or more sub-operations. In such embodiments, the maneuver component 230 determines at least one maneuver associated with one or more of the characteristic and the position corresponding to the characteristic. The at least one maneuver may be associated with a control command associated with the characteristic or indicated by an input of the operator, via a gesture or voice command. In some instances, the maneuver component 230 identifies the one or more maneuver from a set of maneuvers, with each maneuver in the set being associated with one or more characteristics or one or more commands (e.g., gesture commands, voice commands, or motion-based commands). Once selected, the maneuver component 230 may pass the at least one maneuver to the flight component 240.

Upon determining the at least one maneuver and receiving the at least one maneuver, the flight component 240 controls the one or more drone control components to execute the at least one maneuver while changing the current position of the drone to the position (e.g., the subsequent position) corresponding to the characteristic. In some embodiments, the flight component 240 controls the drone control components to change the position of the drone in a manner associated with a command (e.g., a gesture command, a voice command, or a motion-based command). For example, where the command indicates a spiral motion for moving the drone from the current position to the subsequent position, the maneuver component 230 may select an arc or spiral maneuver from the set of maneuvers. The flight component 240 may then determine a path between the current position and the subsequent position in an arc corresponding to the spiral motion.

Figure 9:
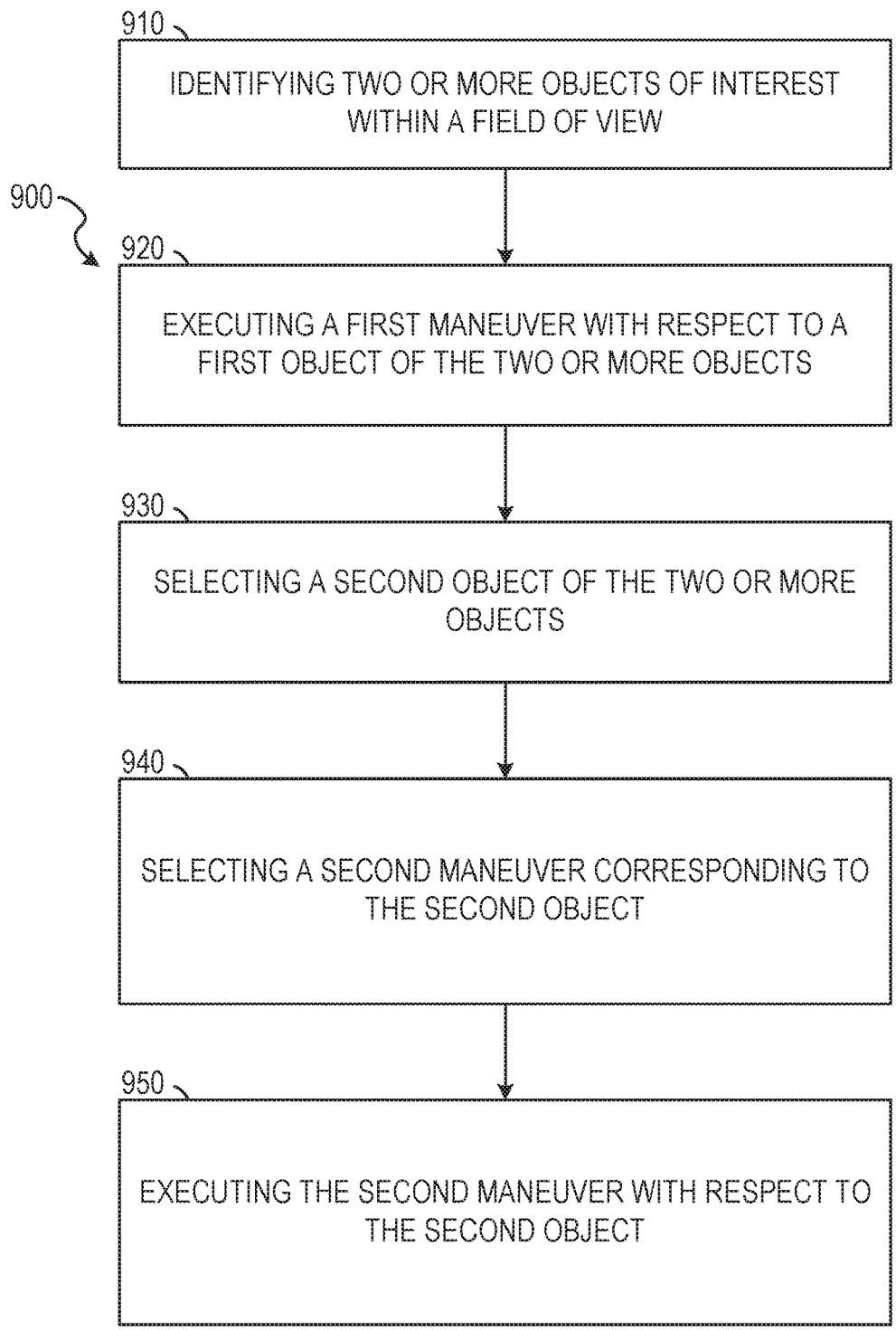
FIG. 9 is a flow diagram illustrating an example method for control of a remote device, according to some example embodiments.

FIG. 9 depicts a flow diagram illustrating an example method 900 for control a device remote from an operator. The operations of method 900 may be performed by components of the control system 160. In some instances, certain operations of the method 900 may be performed using one or more operations of the method 400, 500, 600, or 700 or as sub-operations of one or more operations of the method 400, 500, 600, or 700, as will be explained in more detail below.

In operation 910, the image control component 250 identifies two or more objects of interest within a field of view of the image capture device. The image control component 250, in cooperation with the sensor component 210, may identify two or more objects of interest within the field of view in a manner similar to or the same as described above with respect to operations 520, 720 or 730. In some embodiments, the image control component 250 identifies objects of interest using one or more image recognition, facial recognition, shape recognition, edge detection, or other suitable operations configured to identify one or more of an object and a type of object within the field of view. In some instances, the image control component 250 identifies the two or more objects of interest according to a mode or command. For example, where the image capture device is set to a mode configured for capturing images of people, or an input of the operator indicates people as objects of interest, the image control component 250 may perform one or more facial recognition operations to identify people within the field of view. Similarly, the image control component 250 may select an object recognition model trained for people detection and perform object recognition to identify two or more people as objects of interest in the field of view. Although described with respect to people, it should be understood that the image control component 250 may be configured to identify any suitable object of interest within the field of view.

In operation 920, the flight component 240 executes a first maneuver with respect to a first object of interest of the two or more objects of interest. In some embodiments, the flight component 240 executes the first maneuver based on a command associated with the first object of interest. For example, where the first object of interest is a first person, the sensor components 210 may identify a command received from a voice, gesture, or motion of the first object of interest. In some instances, one or more components of the control system 160 may initially identify the first person as an initial operator. The sensor component 210 may receive a command from the first person and pass the command to the maneuver component 230 to identify the first maneuver corresponding to the first command. The maneuver component 230 may pass the first maneuver to the flight component 240 to execute the first maneuver by controlling the drone control components. In some instances, as described above, the flight component 240 may determine a set of motions, such as a flight path, for executing the first maneuver and automatically manipulate the one or more drone control components to execute the first maneuver.

In operation 930, the maneuver component 230 selects a second object of interest of the two or more objects of interest. In some embodiments, the maneuver component 230 selects the second object of interest (e.g., a second person) as a subsequent or second operator. The selection of the second operator may be in response to a command (e.g., a voice command, a gesture command, or a motion command) of the first operator. For example, after the flight component 240 executes the first maneuver corresponding to a first command of the first operator, the sensor component 210 may receive or detect a subsequent command of the first operator. The subsequent command may indicate control transfer from the first operator to the second person. In response to receiving the subsequent command for control transfer, the sensor component 210 passes the control transfer command to the maneuver component 230. The maneuver component 230, in cooperation with the sensor component 210 may identify and select the second person as an object of the transfer control and a designated operator to which control is to be transferred.

For example after executing the first maneuver, the sensor component 210 may detect a gesture of the first operator indicating the second person, such as the first operator pointing to the second person. The gesture may continue with another hand movement, such as a transition from the first operator's right hand pointing at the second person to the first operator's right hand being positioned, palm up, with fingers directed toward the second person. The combination of pointing and open hand gesture may correspond to a desire to transfer control of the drone from the first operator to the second person. Upon detecting such a control gesture, the sensor component 210 and the maneuver component 230 may execute operation 830 as described above. Although described with respect to a hand gesture, it should be understood that such a command may also incorporate or entirely comprise alternative gestures (e.g., alternative hand gestures, arm gestures, head gestures, or combinations thereof), voice gestures (e.g., words spoken by the first operator such as "transfer control to" or "you try"), combinations thereof, or any other suitably detectable command.

In some embodiments, the maneuver component 230 may select the second person or object of interest automatically, such as in response to a turn-based system of operation. The turn-based operation may enable automatic transfer of drone control from the first operator to a second authorized person in response to expiration of a time period, a number of maneuvers, a distance, a battery life, or any other suitable basis for determining a share of operational time of the drone.

In some instances, the maneuver component 230 selects the second person or object of interest based on a permission or authorization of the second object of interest. In such instances, the maneuver component 230, alone or in cooperation with the sensor component 210, may identify the second person as an authorized user of the drone. The authorization may be predetermined and associated with an identifier, facial characteristics, or other suitable aspect of or aspect associated with the second object of interest. The authorization may also be established dynamically, such as described above with a transfer control passing authorization for drone control from the first operator to the second person. Upon determining a valid use authorization for the second person, the maneuver component 230 may select the second person as described above.

In some embodiments, the maneuver component 230 selects the second object of interest from a plurality of objects of interest or persons of interest. For example, five people may be depicted within the field of view of the image capture device of the drone. The maneuver component 230 may select the second person based on a transfer control from the first operator indicating the second person, as described above. The maneuver component 230 may also select the second person in response to a user hierarchy, in turn based operation, selecting the second person as a next operator designated on a list of authorized operators. The maneuver component 230 may also select the second person based on a proximity of the second person (e.g., the second person being closest to the drone), a position of the second person, an orientation of the second person, a characteristic of the second person, combinations thereof, combinations of the above aspects and an authorization or turn, or any other suitable consideration.

In operation 940, the maneuver component 230 selects a second maneuver corresponding to the second object of interest. In some embodiments, the maneuver component 230 selects the second maneuver in response to receiving an indication of a command detected by the sensor component 210. The sensor component 210 may detect a command from the second person, designated as a second operator, as described above. The sensor component 210 may pass the command to the maneuver component 230 as a second command. Upon receiving the second command, the maneuver component may select the second maneuver from a set of maneuvers. The second command may correspond to the second maneuver based on an association of the second command and the second maneuver in a database, data table, or other suitable memory structure within or accessible by the maneuver component 230. The maneuver component 230 may select the second maneuver in a manner similar to or the same as described above in other methods or operations contained in the present disclosure.

In operation 950, the flight component 240 executes the second maneuver with respect to the second object of interest. The second maneuver may be executed by controlling the one or more drone control components to move the drone within the three dimensional space in which the drone is operating. The flight component 240 may execute the second maneuver in a manner similar to or the same as described above with respect to one or more of operations 440, 430, 520, 740, and 820.

Figure 10:
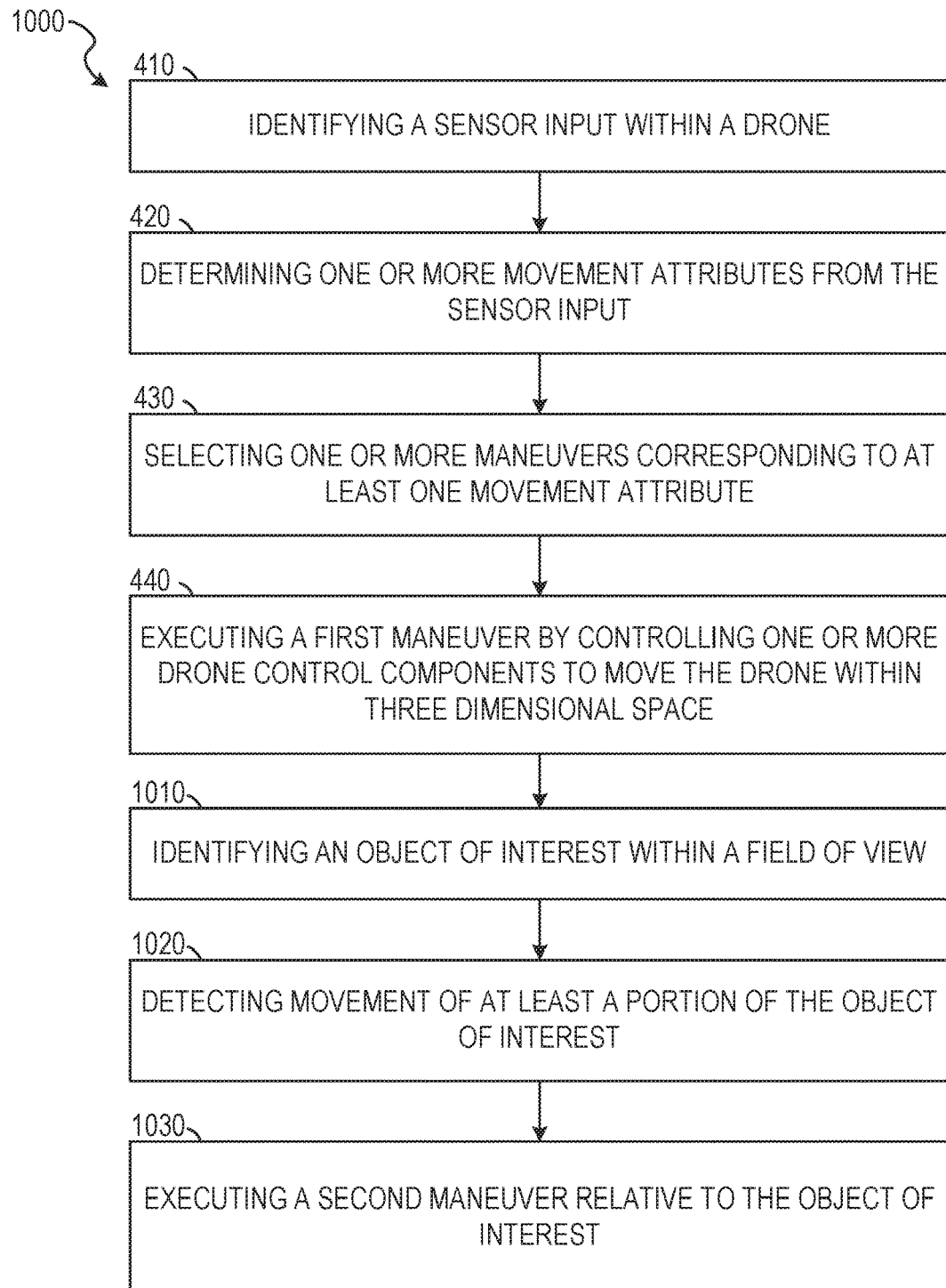
FIG. 10 is a flow diagram illustrating an example method for control of a remote device, according to some example embodiments.

FIG. 10 depicts a flow diagram illustrating an example method 1000 for control a device remote from an operator. The operations of method 1000 may be performed by components of the control system 160. In some instances, certain operations of the method 1000 may be performed using one or more operations of the methods 400-900 or as sub-operations of one or more operations of the methods 400-900, as will be explained in more detail below. As shown in FIG. 10, the operations of method 1000 may be performed after operation 440, where operation 440 executes the one or more maneuvers as a first maneuver.

In operation 1010, the image control component 250 identifies an object of interest within a field of view of the image capture device. In some embodiments, the image control component 250 identifies the object of interest in a manner similar to or the same as described above with respect to one or more of operations 520, 720, 730, 810, and 910. The object of interest may be identified using image recognition, edge detection, facial recognition, or any other suitable object detection techniques.

In some embodiments, the object of interest may be identified based on an associated identifier. In such instances, the object of interest may be positioned proximate to a mobile computing device (e.g., a mobile phone, a smart watch, or a radio frequency identification (RFID) device or tag). The sensor component 210 may detect a signal emanating from the mobile computing device and determine an identifier for the mobile computing device within the signal and within a set of identifiers stored within memory of the control system 160 or accessibly thereto. In some embodiments, upon detecting the signal containing the identifier, the sensor component 210 or the image control component 250 determines an object of interest associated with the identifier from a data source containing the set of identifiers and associated objects of interest. One or more of the sensor component 210, the movement component 220, and the image control component 250 may determine a position of the mobile computing device associated with the identifier. The image control component 250 may use the position of the mobile computing device as the object of interest or identify an object of interest proximate to the location of the mobile computing device.

The sensor component 210 may also detect a presence of a plurality of mobile computing devices proximate to or within communications range of the control system 160 or the drone. The sensor component 210, in cooperation with the communication component 260, may transmit a signal requesting an identifier for the mobile computing devices. The request may be configured to request an identifier having a type, configuration, or encoding known to the control system 160 or the drone. The sensor component 210 may receive a response from one or more of the mobile computing devices and identify a specified mobile computing device associated with a received identifier which matches one of the set of identifiers known to the control system 160. The sensor component 210 may then pass the received identifier to the image control component 250 for use in identifying the object of interest.

In operation 1020, the image control component 250 detects movement of at least a portion of the object of interest. The image control component 250, alone or in cooperation with the sensor component 210, may detect the movement of the object of interest among a set of images or within a video stream captured by the image capture device coupled to the drone. The movement may be detected as one or more changes in position of at least a portion of the object of interest in successive images of the set of images or frames in the video stream. In some instances, the movement of the portion of the object of interest corresponds with a gesture command. The gesture command, as described above, may be a movement or a combination of movements associated with a command representing one or more maneuvers.

In some embodiments, the image control component 250 detects the movement of the portion of the object of interest as a position change of the portion of the object of interest by comparing a first position of the portion of the object of interest in a first image or frame with a second position of the portion of the object of interest in a second image or frame. In detecting the movement or position change, the image control component 250 generates a set of bounding boxes encompassing differing portions of the object of interest. A first bounding box may be generated to encompass the object of interest. A second bounding box may be generated to encompass the portion of the object of interest for which movement is being detected. The image control component 250 compares one or more coordinates or a position of the second bounding box relative to the first bounding box. A change the one or more coordinates of the second bounding box or the position of the second bounding box relative to the first bounding box indicates a movement of the portion of the object of interest.

For example, where the portion of the object of interest is a hand, the second bounding box may encompass at least a portion of the hand. One or more characteristics or aspects of the second bounding box may be anchored to a characteristic or aspect of the hand, such that the image control component 250 may detect one or more of a change in vertical position, a change in horizontal position, a rotation, a translation, an expansion, a contraction, or any other suitable motion using the second bounding box.

In some embodiments, the movement of the portion of the object of interest corresponds to a maneuver. As described above, the maneuver may be identified based on the gesture or movement of the portion of the object of interest. The maneuver component 230 may select the maneuver from a set of maneuvers based on an association of the gesture and the maneuver in a data source. In some instances the movement is detected after an initial or first maneuver. The first maneuver may be performed in response to an initial motion of the drone, such as a toss or launch of the drone, described above with respect to some embodiments of the method 400. In such instances, the maneuver corresponding to the movement of the portion of the object of interest is a subsequent or second maneuver. The drone, using one or more components of the control system 160, may initially perform the first maneuver. Once the drone performs the maneuver, the drone may be positioned or the flight component 240 may position the drone at a location suitable to perform the second maneuver based on the detected movement.

In operation 1030, the flight component 240 executes the second maneuver relative to the object of interest. The flight component 240 may execute the second maneuver in a manner similar to or the same as described above with respect to operations 440, 530, 720, 640, 920, or 950.

Figure 11:
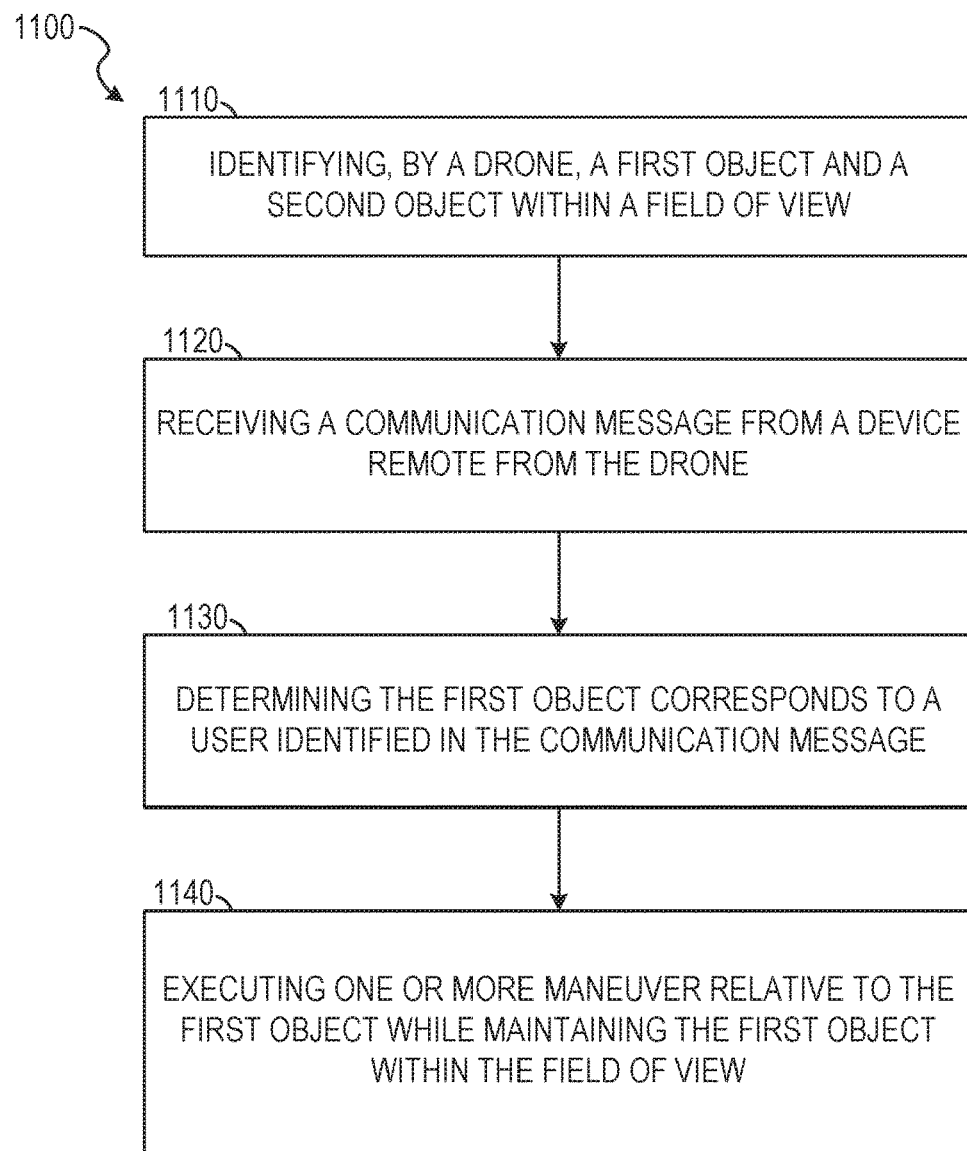
FIG. 11 is a flow diagram illustrating an example method for control of a remote device, according to some example embodiments.

FIG. 11 depicts a flow diagram illustrating an example method 1100 for control a device remote from an operator. The operations of method 1100 may be performed by components of the control system 160. In some instances, certain operations of the method 1100 may be performed using one or more operations of the methods 400-1000 or as sub-operations of one or more operations of the methods 400-1000, as will be explained in more detail below.

In operation 1110, the image control component 250 identifies a first object of interest and a second object of interest within a field of view of the image capture device. The image control component 250 may identify the first and second objects of interest in a manner similar to or the same as described above with respect to operations 520, 720, 730, 810, and 910.

In operation 1120, the input component 270 receives a communication message from a client device remote from the drone. In some embodiments, the communication message comprises an audio stream. The audio stream may be captured by a mobile computing device associated with a user, such as the current operator of the drone. The mobile computing device, such as a smart phone or a smart watch, may be positioned proximate to the operator of the drone and capture the audio stream and transmit at least a portion of the audio stream to the input component 270 of the control system 160.

In some embodiments, the communication message comprises an attribute identifying a user. The attribute may be a name, an identifier, a voice pattern, a keyword or code, or any other identifying attribute associated with the current operator of the drone. In some embodiments, the input component 270 may compare at least a portion of the audio stream to attributes associated with the user. For example, the input component 270 may compare the voice pattern to a representation of a voice pattern of the user, stored within or accessible to the control system 160. The input component 270 may determine the voice pattern received in the message matches or is substantially similar to the voice pattern of the user, and thereby identify the user as an authorized operator of the drone.

In operation 1130, the image control component 250 determines the first object of interest corresponds to the user identified in the communication message. In some embodiments, the image control component 250 receives an indication from the input component 270 that the attribute is associated with the current operator of the drone and one or more of a position associated with the message, the mobile computing device transmitting the message, or a triangulated position of the audio stream identified from one or more microphones. The image control component 250 may determine the first object of interest corresponds to the user by comparing the position associated with the message (e.g., the position of the mobile computing device or triangulated for the audio stream) and a position of the first object of interest detected within the field of view of the image capture device coupled to the drone.

In operation 1140, the flight component 240 executes the one or more maneuver relative to the first object of interest while maintaining the first object of interest within the field of view of the image device. In some embodiments, the first object of interest is maintained within the field of view during a pendency of executing the one or more maneuver. The flight component 240 may execute the one or more maneuver in a manner similar to or the same as described above with respect to operations 440, 530, 620, 740, 920, or 950.

Previous systems for controlling devices remote from a user often required wired or wireless control devices purpose built to communicate with and control the remote device. Often operation of the remote device without the control device was impossible. Recently devices have been configured for control using an application stored and operated on a mobile computing device, such as a smart phone. Application based systems similarly may not allow for a remote device to be controlled or operated without a computing device executing the application and receiving input in the application from an operator. Such systems are also limited by a communications range of the control device attempting to relay input signals to the remote device. As such, previous systems and methods present technical issues with respect to remote device control, operation, and communication, among others. As described herein, embodiments of the present disclosure may address or provide technical solutions to one or more of the described technical problems, among others not explicitly listed. Although described with respect to specified technical problems and technical solutions, it should be understood that the present description is not solely limited to the recited problems and solutions. Embodiments described herein may also address additional technical problems and provide additional technical solutions, without limitation.

Some of the embodiments of the present disclosure describe systems and methods for controlling or operating a remote device without regard to a communications range of a control device or a mobile computing device. Example embodiments describe systems and methods for automated or autonomous operation of a remote device responsive to an initial physical or visual input of a user, without relying on a control device. Such systems and methods enable hands free and input free operation of the remote device.

Modules, Components, and Logic

Certain embodiments are described herein as including logic or a number of components, modules, or mechanisms. Components can constitute hardware components. A "hardware component" is a tangible unit capable of performing certain operations and can be configured or arranged in a certain physical manner. In various example embodiments, computer systems (e.g., a standalone computer system, a client computer system, or a server computer system) or hardware components of a computer system (e.g., at least one hardware processor, a processor, or a group of processors) is configured by software (e.g., an application or application portion) as a hardware component that operates to perform certain operations as described herein.

In some embodiments, a hardware component is implemented mechanically, electronically, or any suitable combination thereof. For example, a hardware component can include dedicated circuitry or logic that is permanently configured to perform certain operations. For example, a hardware component can be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component can include software encompassed within a general-purpose processor or other programmable processor. It will be appreciated that the decision to implement a hardware component mechanically, in dedicated and permanently configured circuitry, or in temporarily configured circuitry (e.g., configured by software) can be driven by cost and time considerations.

Accordingly, the phrase "hardware component" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented component" refers to a hardware component. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g. comprising different hardware components) at different times. Software can accordingly configure a particular processor or processors, for example, to constitute a particular hardware component at one instance of time and to constitute a different hardware component at a different instance of time.

Hardware components can provide information to, and receive information from, other hardware components. Accordingly, the described hardware components can be regarded as being communicatively coupled. Where multiple hardware components exist contemporaneously, communications can be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component performs an operation and stores the output of that operation in a memory device to which it is communicatively coupled. A further hardware component can then, at a later time, access the memory device to retrieve and process the stored output. Hardware components can also initiate communications with input or output devices, and can operate on a resource (e.g., a collection of information).

The various operations of example methods described herein can be performed, at least partially, by processors that are temporarily configured (e.g., by software) or permanently configured to perform the relevant operations. Whether temporarily or permanently configured, such processors constitute processor-implemented components that operate to perform operations or functions described herein. As used herein, "processor-implemented component" refers to a hardware component implemented using processors.

Similarly, the methods described herein can be at least partially processor-implemented, with a particular processor or processors being an example of hardware. For example, at least some of the operations of a method can be performed by processors or processor-implemented components. Moreover, the processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via appropriate interfaces (e.g., an Application Program Interface (API)).

The performance of certain of the operations may be distributed among the processors, not only residing within a single machine, but deployed across a number of machines. In some example embodiments, the processors or processor-implemented components are located in a single geographic location (e.g., within a home environment, an office environment, or a server farm). In other example embodiments, the processors or processor-implemented components are distributed across a number of geographic locations.

Applications

Figure 12:
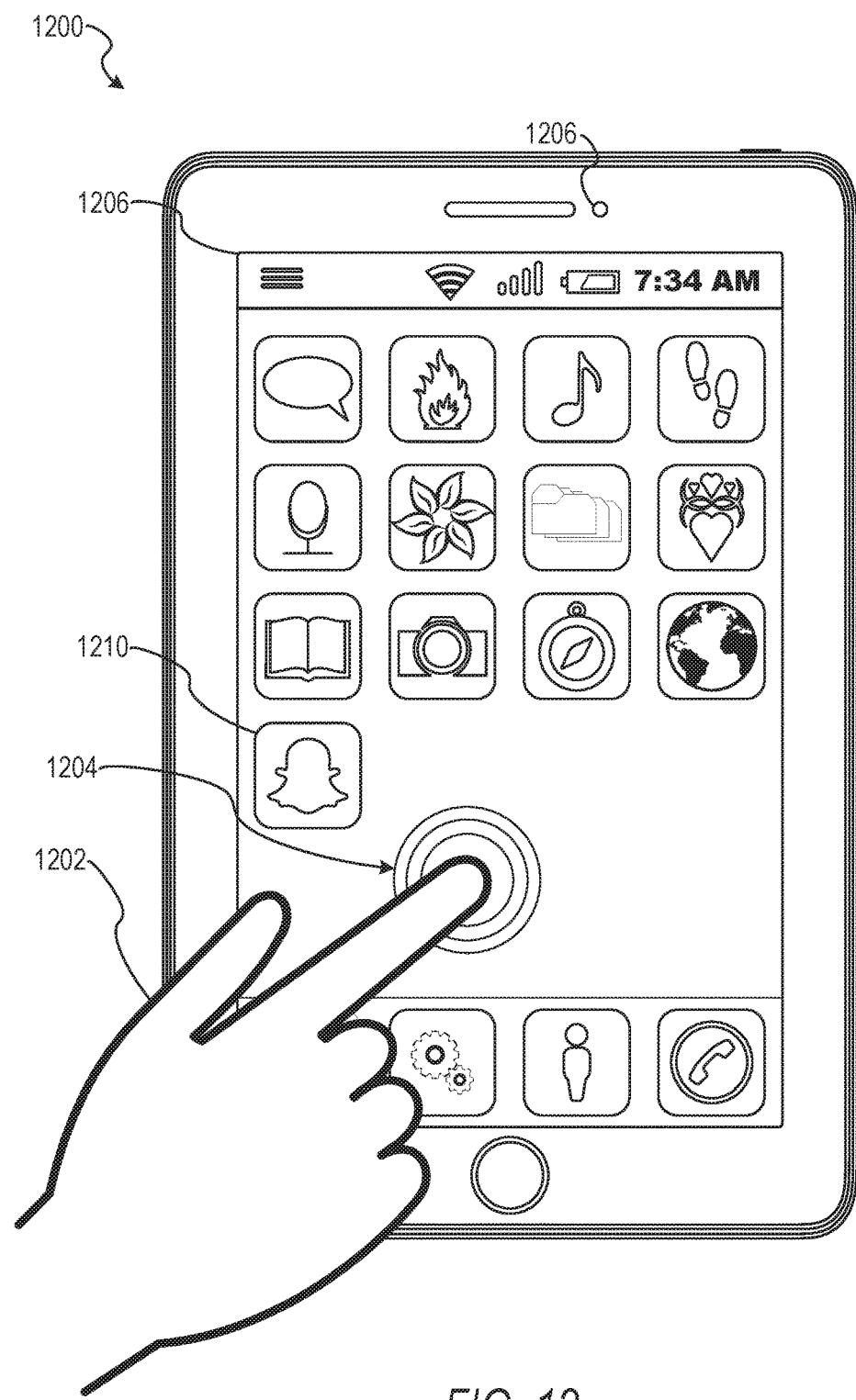
FIG. 12 is a user interface diagram depicting an example mobile device and mobile operating system interface, according to some example embodiments.

FIG. 12 illustrates an example mobile device 1200 executing a mobile operating system (e.g., IOS™, ANDROID™, WINDOWS® Phone, or other mobile operating systems), consistent with some embodiments. In one embodiment, the mobile device 1200 includes a touch screen operable to receive tactile data from a user 1202. For instance, the user 1202 may physically touch 1204 the mobile device 1200, and in response to the touch 1204, the mobile device 1200 may determine tactile data such as touch location, touch force, or gesture motion. In various example embodiments, the mobile device 1200 displays a home screen 1206 (e.g., Springboard on IOS™) operable to launch applications or otherwise manage various aspects of the mobile device 1200. In some example embodiments, the home screen 1206 provides status information such as battery life, connectivity, or other hardware statuses. The user 1202 can activate user interface elements by touching an area occupied by a respective user interface element. In this manner, the user 1202 interacts with the applications of the mobile device 1200. For example, touching the area occupied by a particular icon included in the home screen 1206 causes launching of an application corresponding to the particular icon.

The mobile device 1200, as shown in FIG. 12, includes an imaging device 1208. The imaging device 1208 may be a camera or any other device coupled to the mobile device 1200 capable of capturing a video stream or one or more successive images. The imaging device 1208 may be triggered by the control system 160 or a selectable user interface element to initiate capture of a video stream or succession of images and pass the video stream or succession of images to the control system 160 for processing according to the one or more methods described in the present disclosure.

Many varieties of applications (also referred to as "apps") can be executing on the mobile device 1200, such as native applications (e.g., applications programmed in Objective-C, Swift, or another suitable language running on IOS™, or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 1200 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 1200 includes a social messaging app 1210 such as SNAPCHAT® that, consistent with some embodiments, allows users to exchange ephemeral messages that include media content. In this example, the social messaging app 1210 can incorporate aspects of embodiments described herein. For example, in some embodiments the social messaging application includes an ephemeral gallery of media created by users the social messaging application. These galleries may consist of videos or pictures posted by a user and made viewable by contacts (e.g., "friends") of the user. Alternatively, public galleries may be created by administrators of the social messaging application consisting of media from any users of the application (and accessible by all users). In yet another embodiment, the social messaging application may include a "magazine" feature which consists of articles and other content generated by publishers on the social messaging application's platform and accessible by any users. Any of these environments or platforms may be used to implement concepts of the present inventive subject matter.

In some embodiments, an ephemeral message system may include messages having ephemeral video clips or images which are deleted following a deletion trigger event such as a viewing time or viewing completion. In such embodiments, a device implementing the control system 160 may control a device remote from an operator, based on actions, sounds, characteristics, or context of the operator to generate images, image streams, video streams, sound recordings, or combinations thereof for transmission or inclusion within the ephemeral message, and transmit the ephemeral message to another device using the ephemeral message system.

Software Architecture

Figure 13:
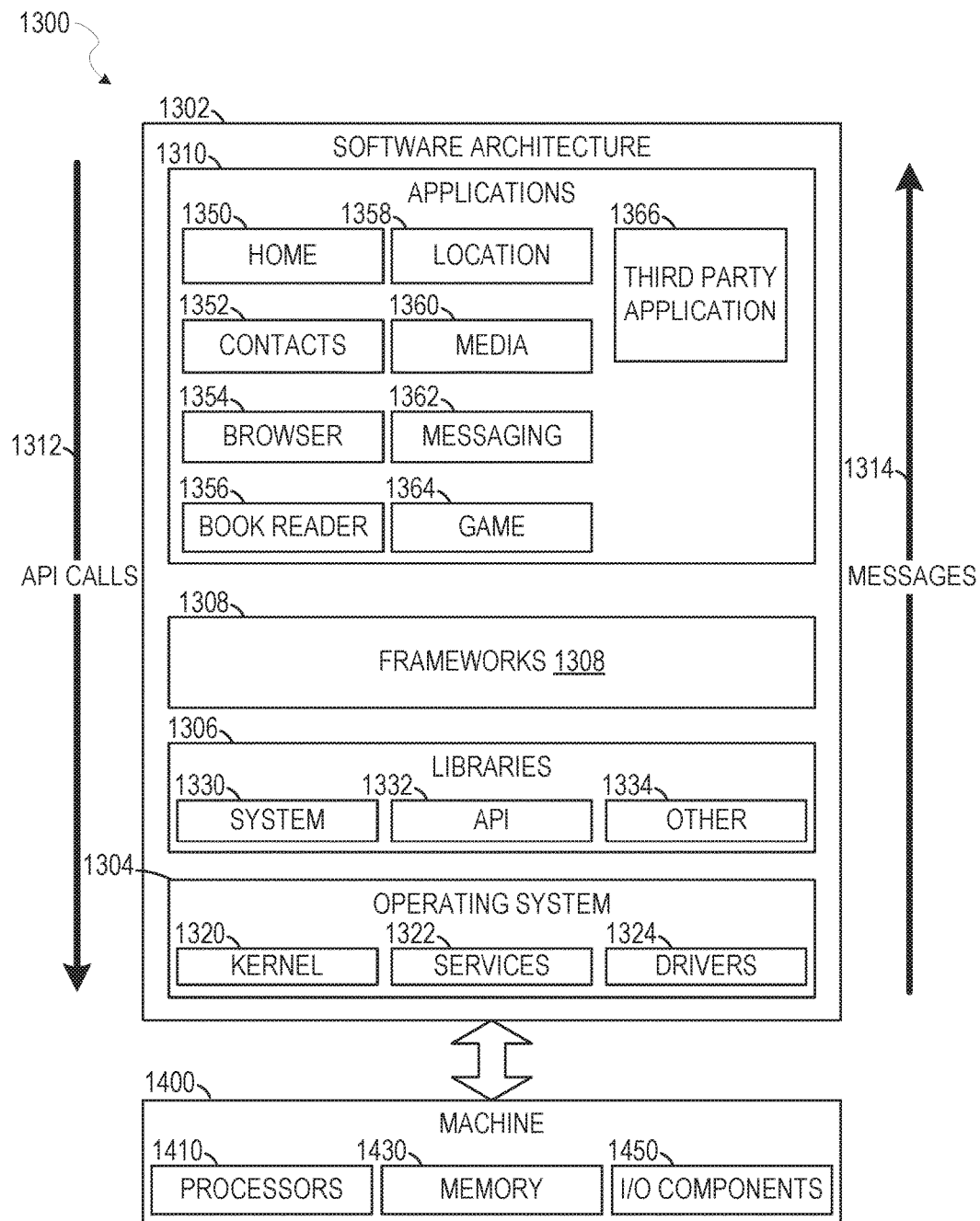
FIG. 13 is a block diagram illustrating an example of a software architecture that may be installed on a machine, according to some example embodiments.

FIG. 13 is a block diagram 1300 illustrating an architecture of software 1302, which can be installed on the devices described above. FIG. 13 is merely a non-limiting example of a software architecture, and it will be appreciated that many other architectures can be implemented to facilitate the functionality described herein. In various embodiments, the software 1302 is implemented by hardware such as machine a 1400 of FIG. 14 that includes processors 1410, memory 1430, and I/O components 1450. In this example architecture, the software 1302 can be conceptualized as a stack of layers where each layer may provide a particular functionality. For example, the software 1302 includes layers such as an operating system 1304, libraries 1306, frameworks 1308, and applications 1310. Operationally, the applications 1310 invoke application programming interface (API) calls 1312 through the software stack and receive messages 1314 in response to the API calls 1312, consistent with some embodiments.

In various implementations, the operating system 1304 manages hardware resources and provides common services. The operating system 1304 includes, for example, a kernel 1320, services 1322, and drivers 1324. The kernel 1320 acts as an abstraction layer between the hardware and the other software layers consistent with some embodiments. For example, the kernel 1320 provides memory management, processor management (e.g., scheduling), component management, networking, and security settings, among other functionality. The services 1322 can provide other common services for the other software layers. The drivers 1324 are responsible for controlling or interfacing with the underlying hardware, according to some embodiments. For instance, the drivers 1324 can include display drivers, camera drivers. BLUETOOTH® drivers, flash memory drivers, serial communication drivers (e.g., Universal Serial Bus (USB) drivers). WI-FI® drivers, audio drivers, power management drivers, and so forth.

In some embodiments, the libraries 1306 provide a low-level common infrastructure utilized by the applications 1310. The libraries 1306 can include system libraries 1330 (e.g., C standard library) that can provide functions such as memory allocation functions, string manipulation functions, mathematic functions, and the like. In addition, the libraries 1306 can include API libraries 1332 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1306 can also include a wide variety of other libraries 1334 to provide many other APIs to the applications 1310.

The frameworks 1308 provide a high-level common infrastructure that can be utilized by the applications 1310, according to some embodiments. For example, the frameworks 1308 provide various graphic user interface (GUI) functions, high-level resource management, high-level location services, and so forth. The frameworks 1308 can provide a broad spectrum of other APIs that can be utilized by the applications 1310, some of which may be specific to a particular operating system or platform.

In an example embodiment, the applications 1310 include a home application 1350, a contacts application 1352, a browser application 1354, a book reader application 1356, a location application 1358, a media application 1360, a messaging application 1362, a game application 1364, and a broad assortment of other applications such as a third party application 1366. According to some embodiments, the applications 1310 are programs that execute functions defined in the programs. Various programming languages can be employed to create the applications 1310, structured in a variety of manners, such as object-oriented programming languages (e.g., Objective-C, Java, or C++) or procedural programming languages (e.g., C or assembly language). In a specific example, the third party application 1366 (e.g., an application developed using the ANDROID™ or IOS™ software development kit (SDK) by an entity other than the vendor of the particular platform) may be mobile software running on a mobile operating system such as IOS™, ANDROID™, WINDOWS® PHONE, or another mobile operating systems. In this example, the third party application 1366 can invoke the API calls 1312 provided by the operating system 1304 to facilitate functionality described herein.

Example Machine Architecture and Machine-Readable Medium

Figure 14:
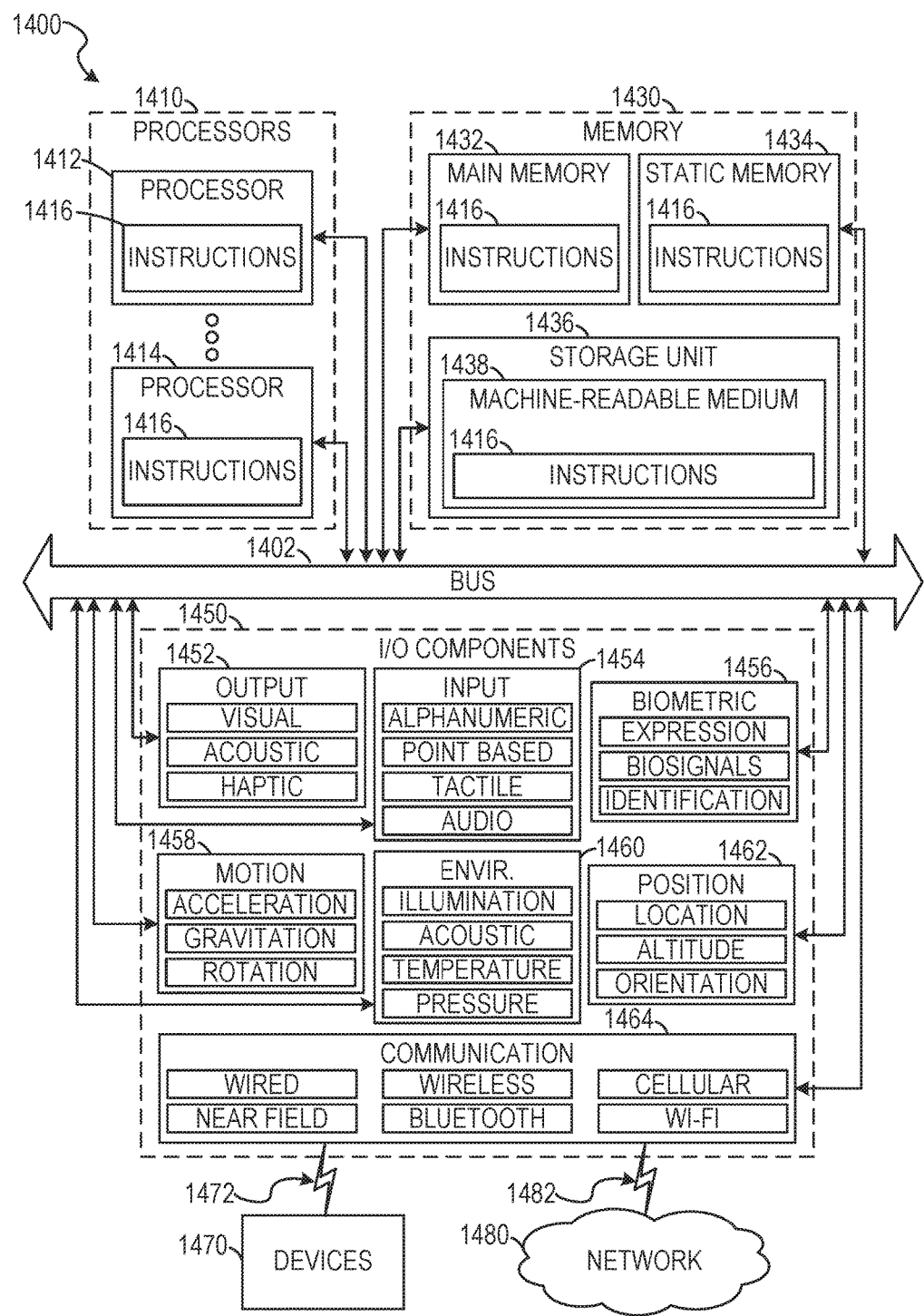
FIG. 14 is a block diagram presenting a diagrammatic representation of a machine in the form of a computer system within which a set of instructions may be executed for causing the machine to perform any of the methodologies discussed herein, according to an example embodiment.

FIG. 14 is a block diagram illustrating components of a machine 1400, according to some embodiments, able to read instructions (e.g., processor executable instructions) from a machine-readable medium (e.g., a non-transitory machine-readable storage medium or non-transitory processor-readable storage medium) and perform any of the methodologies discussed herein. Specifically, FIG. 14 shows a diagrammatic representation of the machine 1400 in the example form of a computer system, within which instructions 1416 (e.g., software, a program, an application, an applet, an app, or other executable code) for causing the machine 1400 to perform any of the methodologies discussed herein can be executed. In alternative embodiments, the machine 1400 operates as a standalone device or can be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1416, sequentially or otherwise, that specify actions to be taken by the machine 1400. Further, while only a single machine 1400 is illustrated, the term "machine" shall also be taken to include a collection of machines 1400 that individually or jointly execute the instructions 1416 to perform any of the methodologies discussed herein.

In various embodiments, the machine 1400 comprises processors 1410, memory 1430, and I/O components 1450, which can be configured to communicate with each other via a bus 1402. In an example embodiment, the processors 1410 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) include, for example, a processor 1412 and a processor 1414 that may execute the instructions 1416. The term "processor" is intended to include multi-core processors that may comprise two or more independent processors (also referred to as "cores") that can execute instructions 1416 contemporaneously. Although FIG. 14 shows multiple processors 1410, the machine 1400 may include a single processor with a single core, a single processor with multiple cores (e.g., a multi-core processor), multiple processors with a single core, multiple processors with multiples cores, or any combination thereof.

The memory 1430 comprises a main memory 1432, a static memory 1434, and a storage unit 1436 accessible to the processors 1410 via the bus 1402, according to some embodiments. The storage unit 1436 can include a machine-readable medium 1438 on which are stored the instructions 1416 embodying any of the methodologies or functions described herein. The instructions 1416 can also reside, completely or at least partially, within the main memory 1432, within the static memory 1434, within at least one of the processors 1410 (e.g., within the processor's cache memory), or any suitable combination thereof, during execution thereof by the machine 1400. Accordingly, in various embodiments, the main memory 1432, the static memory 1434, and the processors 1410 are considered machine-readable media 1438.

As used herein, the term "memory" refers to a machine-readable medium 1438 able to store data temporarily or permanently and may be taken to include, but not be limited to, random-access memory (RAM), read-only memory (ROM), buffer memory, flash memory, and cache memory. While the machine-readable medium 1438 is shown in an example embodiment to be a single medium, the term "machine-readable medium" should be taken to include a single medium or multiple media (e.g., a centralized or distributed database, or associated caches and servers) able to store the instructions 1416. The term "machine-readable medium" shall also be taken to include any medium, or combination of multiple media, that is capable of storing instructions (e.g., instructions 1416) for execution by a machine (e.g., machine 1400), such that the instructions, when executed by processors of the machine 1400 (e.g., processors 1410), cause the machine 1400 to perform any of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1450 include a wide variety of components to receive input, provide output, produce output, transmit information, exchange information, capture measurements, and so on. In general, it will be appreciated that the I/O components 1450 can include many other components that are not shown in FIG. 14. The I/O components 1450 are grouped according to functionality merely for simplifying the following discussion, and the grouping is in no way limiting. In various example embodiments, the I/O components 1450 include output components 1452 and input components 1454. The output components 1452 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1454 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1450 include biometric components 1456, motion components 1458, environmental components 1460, or position components 1462, among a wide array of other components. For example, the biometric components 1456 include components to detect expressions (e.g., hand expressions, facial expressions, vocal expressions, body gestures, or mouth gestures), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1458 include acceleration sensor components (e.g., accelerometer), gravitation sensor components, rotation sensor components (e.g., gyroscope), and so forth. The environmental components 1460 include, for example, illumination sensor components (e.g., photometer), temperature sensor components (e.g., thermometers that detect ambient temperature), humidity sensor components, pressure sensor components (e.g., barometer), acoustic sensor components (e.g., microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1462 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1450 may include communication components 1464 operable to couple the machine 1400 to a network 1480 or devices 1470 via a coupling 1482 and a coupling 1472, respectively. For example, the communication components 1464 include a network interface component or another suitable device to interface with the network 1480. In further examples, communication components 1464 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1470 may be another machine or any of a wide variety of peripheral devices (e.g., a peripheral device coupled via a Universal Serial Bus (USB)).

Moreover, in some embodiments, the communication components 1464 detect identifiers or include components operable to detect identifiers. For example, the communication components 1464 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1464, such as location via Internet Protocol (IP) geo-location, location via WI-FI® signal triangulation, location via detecting a BLUETOOTH® or NFC beacon signal that may indicate a particular location, and so forth.

Transmission Medium

In various example embodiments, portions of the network 1480 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1480 or a portion of the network 1480 may include a wireless or cellular network, and the coupling 1482 may be a Code Division Multiple Access (CDMA) connection, a Global System for Mobile communications (GSM) connection, or another type of cellular or wireless coupling. In this example, the coupling 1482 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1416 are transmitted or received over the network 1480 using a transmission medium via a network interface device (e.g., a network interface component included in the communication components 1464) and utilizing any one of a number of well-known transfer protocols (e.g., Hypertext Transfer Protocol (HTTP)). Similarly, in other example embodiments, the instructions 1416 are transmitted or received using a transmission medium via the coupling 1472 (e.g., a peer-to-peer coupling) to the devices 1470. The term "transmission medium" shall be taken to include any intangible medium that is capable of storing, encoding, or carrying the instructions 1416 for execution by the machine 1400, and includes digital or analog communications signals or other intangible media to facilitate communication of such software.

Furthermore, the machine-readable medium 1438 is non-transitory (in other words, not having any transitory signals) in that it does not embody a propagating signal. However, labeling the machine-readable medium 1438 "non-transitory" should not be construed to mean that the medium is incapable of movement; the medium should be considered as being transportable from one physical location to another. Additionally, since the machine-readable medium 1438 is tangible, the medium may be considered to be a machine-readable device.

Language

Throughout this specification, plural instances may implement components, operations, or structures described as a single instance. Although individual operations of methods are illustrated and described as separate operations, individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method, comprising:
   identifying a sensor input within a drone, the sensor input indicating movement of the drone within a three dimensional space, the drone comprising one or more sensors and one or more drone control components;
   upon receiving the sensor input indicating that the drone moved within the three dimensional space, determining that one or more movement attributes from the sensor input are associated with the drone having been physically displaced by a user, the determining comprising determining that a combination of movement component values, representing movement of the drone within the three-dimensional space, received within the sensor input, matches a set of movement attributes associated with the drone having been physically displaced by the user;
   in response to the determining that the one or more movement attributes are associated with the drone having been physically displaced by the user, selecting one or more maneuvers corresponding to at least one movement attribute of the one or more movement attributes; and
   executing the one or more maneuvers by controlling the one or more drone control components to move the drone within the three dimensional space.

2. The method of claim 1, wherein the drone comprises an image capture device and the method further comprises:
   determining a field of view of the image capture device;
   determining at least one point of focus of the image capture device within the field of view; and
   executing the one or more maneuvers with respect to at least one of the field of view and the at least one point of focus of the image capture device.

3. The method of claim 1, wherein the drone is physically displaced by the user based on an initial toss, roll or spin action performed by the user, wherein the set of movement attributes that matches the combination of movement component values includes values associated with the initial toss, roll or spin action, further comprising:
   determining a reference point within the three dimensional space; and
   executing the one or more maneuvers in relation to the reference point.

4. The method of claim 3, wherein the drone comprises an image capture device and the method further comprises:
   determining a field of view of the image capture device;
   controlling the one or more drone control components to position the reference point within the field of view of the image capture device; and
   executing the one or more maneuvers in relation to the reference point while maintaining at least a portion of the reference point within the field of view of the image capture device.

5. The method of claim 1, wherein the drone comprises an image capture device and the method further comprises:
   determining a field of view of the image capture device;
   identifying an area of interest within the field of view, the area of interest including at least one object of interest;
   tracking the at least one object of interest; and
   executing the one or more maneuvers in relation to the at least one object of interest.

6. The method of claim 5, wherein the object of interest is a person at least partially depicted within the field of view of the image capture device and the method further comprises:
   determining a characteristic of the person depicted within the field of view;
   identifying a position corresponding to the characteristic;
   determining a current position of the drone relative to the person depicted within the field of view; and
   controlling the one or more drone control component to change the current position of the drone to the position corresponding to the characteristic.

7. The method of claim 6, wherein changing the current position of the drone to the position corresponding to the characteristic further comprises:
   determining at least one maneuver associated with one or more of the characteristic and the position corresponding to the characteristic; and
   controlling the one or more drone control component to execute the at least one maneuver while changing the current position of the drone to the position corresponding to the characteristic.

8. The method of claim 1, wherein the drone comprises an image capture device, the one or more maneuvers is a first maneuver, and the method further comprises:

identifying two or more objects of interest within a field of view of the image capture device;
executing the first maneuver with respect to a first object of interest of the two or more objects of interest;
selecting a second object of interest of the two or more objects of interest;
selecting a second maneuver corresponding to the second object of interest; and
executing the second maneuver with respect to the second object of interest, the second maneuver executed by controlling the one or more drone control components to move the drone within the three dimensional space.

9. The method of claim 1, wherein the drone comprises an image capture device, the one or more maneuvers is a first maneuver, and the method further comprises:
identifying the user within a field of view of the image capture device in response to determining that the one or more movement attributes from the sensor input are associated with the drone having been physically displaced by the user;
detecting, based on one or more images captured by the image capture device, a gesture performed by the user; and
executing a second maneuver corresponding to the detected gesture.

10. The method of claim 1, wherein the drone comprises an image capture device and the method further comprises:
identifying a first object of interest and a second object of interest within a field of view of the image capture device;
receiving a communication message from a client device remote from the drone, the communication message comprising an attribute identifying the user;
determining the first object of interest corresponds to the user identified in the communication message; and
executing the one or more maneuver relative to the first object of interest maintaining the first object of interest within the field of view of the image capture device while executing the one or more maneuver.

11. A system comprising:
one or more processors; and
a non-transitory processor-readable storage medium storing processor executable instructions that, when executed by the one or more processors, cause the one or more processors to perform operations comprising:
identifying a sensor input within a drone, the sensor input indicating movement of the drone within a three dimensional space, the drone comprising one or more sensors and one or more drone control components;
upon receiving the sensor input indicating that the drone has moved within the three dimensional space, determining that one or more movement attributes from the sensor input are associated with the drone having been physically displaced by a user, the determining comprising determining that a combination of movement component values, representing movement of the drone within the three-dimensional space, received within the sensor input, matches a set of movement attributes associated with the drone having been physically displaced by the user;
in response to the determining that the one or more movement attributes are associated with the drone having been physically displaced by the user, selecting one or more maneuvers corresponding to at least one movement attribute of the one or more movement attributes; and executing the one or more maneuvers by controlling the one or more drone control components to move the drone within the three dimensional space.

12. The system of claim 11, wherein the drone comprises an image capture device and the operations further comprise:
determining a field of view of the image capture device;
determining at least one point of focus of the image capture device within the field of view; and
executing the one or more maneuvers with respect to at least one of the field of view and the at least one point of focus of the image capture device.

13. The system of claim 11, wherein the drone is physically displaced by the user based on an initial toss, roll or spin action performed by the user, and wherein the operations further comprise:
determining a reference point within the three dimensional space;
determining a field of view of an image capture device coupled to the drone;
controlling the one or more drone control components to position the reference point within the field of view of the image capture device; and
executing the one or more maneuvers in relation to the reference point while maintaining at least a portion of the reference point within the field of view of the image capture device.

14. The system of claim 11, wherein the drone comprises an image capture device and the operations further comprise:
determining a field of view of the image capture device;
identifying the user within the field of view in response to determining that the one or more movement attributes from the sensor input are associated with the drone having been physically displaced by the user;
detecting, based on one or more images captured by the image capture device, a gesture performed by the user; and
executing the one or more maneuvers corresponding to the gesture.

15. The system of claim 14, wherein the object of interest is a person at least partially depicted within the field of view of the image capture device and the operations further comprise:
determining a characteristic of the person depicted within the field of view;
identifying a position corresponding to the characteristic;
determining a current position of the drone relative to the person depicted within the field of view; and
controlling the one or more drone control component to change the current position of the drone to the position corresponding to the characteristic.

16. The system of claim 15, wherein changing the current position of the drone to the position corresponding to the characteristic further comprise:
determining at least one maneuver associated with one or more of the characteristic and the position corresponding to the characteristic; and
controlling the one or more drone control component to execute the at least one maneuver while changing the current position of the drone to the position corresponding to the characteristic.

17. The system of claim 11, wherein the drone comprises an image capture device, the one or more maneuvers is a first maneuver, and the operations further comprise:
identifying two or more objects of interest within a field of view of the image capture device;

executing the first maneuver with respect to a first object of interest of the two or more objects of interest;

selecting a second object of interest of the two or more objects of interest;

selecting a second maneuver corresponding to the second object of interest; and executing the second maneuver with respect to the second object of interest, the second maneuver executed by controlling the one or more drone control components to move the drone within the three dimensional space.

18. A non-transitory processor-readable storage medium storing processor executable instructions that, when executed by a processor of a machine, cause the machine to perform operations comprising:

identifying a sensor input within a drone, the sensor input indicating movement of the drone within a three dimensional space, the drone comprising one or more sensors and one or more drone control components;

upon receiving the sensor input indicating that the drone has moved within the three dimensional space, determining that one or more movement attributes from the sensor input are associated with the drone having been physically displaced by a user, the determining comprising determining that a combination of movement component values, representing movement of the drone within the three-dimensional space, received within the sensor input, matches a set of movement attributes associated with the drone having been physically displaced by the user;

in response to the determining that the one or more movement attributes are associated with the drone having been physically displaced by the user, selecting one or more maneuvers corresponding to at least one movement attribute of the one or more movement attributes; and executing the one or more maneuvers by controlling the one or more drone control components to move the drone within the three dimensional space.

19. The non-transitory processor-readable storage medium of claim 18, wherein the drone comprises an image capture device and the operations further comprise:

determining a field of view of the image capture device;

determining at least one point of focus of the image capture device within the field of view; and executing the one or more maneuvers with respect to at least one of the field of view and the at least one point of focus of the image capture device.

20. The non-transitory processor-readable storage medium of claim 18, wherein the operations further comprise:

determining a reference point within the three dimensional space;

determining a field of view of an image capture device coupled to the drone;

controlling the one or more drone control components to position the reference point within the field of view of the image capture device; and executing the one or more maneuvers in relation to the reference point while maintaining at least a portion of the reference point within the field of view of the image capture device.

* * * * *

UNITED STATES PATENT AND TRADEMARK OFFICE
CERTIFICATE OF CORRECTION

PATENT NO. : 10,768,639 B1
APPLICATION NO. : 15/640061
DATED : September 8, 2020
INVENTOR(S) : Meisenholder et al.

Page 1 of 1

It is certified that error appears in the above-identified patent and that said Letters Patent is hereby corrected as shown below:

On the Title Page

On page 2, in Column 2, under "Other Publications", Line 17, delete "Fina" and insert --Final-- therefor Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*